(12) United States Patent
Tsui

(10) Patent No.: US 10,408,522 B2
(45) Date of Patent: Sep. 10, 2019

(54) COLLAPSIBLE MULTI-PURPOSE CONTAINERS

(71) Applicant: Sam Tung Tsui, Kowloon (HK)

(72) Inventor: Sam Tung Tsui, Kowloon (HK)

( * ) Notice: Subject to any disclaimer, the term of this patent is extended or adjusted under 35 U.S.C. 154(b) by 746 days.

(21) Appl. No.: 14/248,013

(22) Filed: Apr. 8, 2014

(65) Prior Publication Data
US 2015/0253055 A1 Sep. 10, 2015

(30) Foreign Application Priority Data

Mar. 10, 2014 (DE) .................... 20 2014 101 048 U

(51) Int. Cl.
*F25D 3/08* (2006.01)
*B65D 21/08* (2006.01)
(Continued)

(52) U.S. Cl.
CPC .................. *F25D 3/08* (2013.01); *B62B 1/12* (2013.01); *B62B 5/066* (2013.01); *B65D 15/02* (2013.01); *B65D 21/086* (2013.01); *B65D 25/04* (2013.01); *B65D 25/28* (2013.01); *B65D 43/02* (2013.01); *B65D 81/18* (2013.01); *B65D 81/38* (2013.01); *B65D 81/3818* (2013.01); *B62B 1/008* (2013.01); *B62B 5/067* (2013.01);
(Continued)

(58) Field of Classification Search
CPC ............ A45C 13/22; A45C 13/26–262; B65D 21/08; B65D 21/083; B65D 21/086; F25D 3/06; F25D 3/08
USPC .......................... 220/8, 666; 62/457.2–457.5
See application file for complete search history.

(56) References Cited

U.S. PATENT DOCUMENTS

| 1,724,743 | A | * | 8/1929 | Allen ....................... A45C 7/00 220/8 |
| 4,492,313 | A | | 1/1985 | Touzani |

(Continued)

FOREIGN PATENT DOCUMENTS

| CN | 204527899 U | 8/2015 |
| CN | 206880538 U | 1/2018 |
| CN | 207477319 U | 6/2018 |

OTHER PUBLICATIONS

Normann Copenhagen, Strainer blue, Funnel & Strainer, 6 pages, visited Dec. 19, 2013, available at <http://www.normann-copenhagen.com/products/strainer>.

*Primary Examiner* — Orlando E Aviles
*Assistant Examiner* — Antonio R Febles
(74) *Attorney, Agent, or Firm* — Hinshaw & Culbertson LLP

(57) ABSTRACT

Collapsible indoor and outdoor containers having a collapsible wall section with shape-retaining characteristics are disclosed. In particular, collapsible coolers, fish bins, and wheeled vertical bins are provided. The collapsible wall section may include foldable tiers of a flexible material, each tier having at least one stable, relatively expanded position and at least one stable, relatively collapsed position; and an intervening, non-folding tier composed of a different, relatively stiff or rigid material. The coolers, fish bins, and wheeled vertical bins are each advantageously provided with a collapsible insert container that nests within and collapses together with a shell of the respective container, the respective wall folds of the shell and insert meshing together to result in a combined collapsed vertical dimension as small or nearly as small as that of the collapsed shell alone.

3 Claims, 19 Drawing Sheets

(51) Int. Cl.
*B65D 25/28* (2006.01)
*B65D 81/38* (2006.01)
*B62B 1/12* (2006.01)
*B62B 5/06* (2006.01)
*B65D 8/00* (2006.01)
*B65D 25/04* (2006.01)
*B65D 43/02* (2006.01)
*B65D 81/18* (2006.01)
*B65D 43/16* (2006.01)
*B65D 45/20* (2006.01)
*B62B 1/00* (2006.01)

(52) U.S. Cl.
CPC ...... *B65D 25/2852* (2013.01); *B65D 25/2858* (2013.01); *B65D 43/163* (2013.01); *B65D 45/20* (2013.01); *B65D 2543/0087* (2013.01); *B65D 2543/00092* (2013.01); *B65D 2543/0099* (2013.01); *B65D 2543/00194* (2013.01); *B65D 2543/00296* (2013.01); *B65D 2543/00518* (2013.01); *B65D 2543/00537* (2013.01); *B65D 2543/00555* (2013.01); *B65D 2543/00879* (2013.01); *B65D 2543/00972* (2013.01)

(56) References Cited

U.S. PATENT DOCUMENTS

| | | | |
|---|---|---|---|
| RE32,379 E | 3/1987 | Touzani | |
| 5,310,068 A | 5/1994 | Saghri | |
| 5,900,293 A | 5/1999 | Zettle | |
| 6,354,456 B2 | 3/2002 | Rapson | |
| 6,705,471 B2 | 3/2004 | Kataoka | |
| 6,736,285 B2 * | 5/2004 | Stewart-Stand | A45F 3/20 206/218 |
| 6,848,695 B2 * | 2/2005 | Panasewicz | B62B 1/006 206/499 |
| 7,584,972 B2 * | 9/2009 | Myers | B62B 5/0083 280/47.131 |
| 7,654,402 B2 | 2/2010 | Kusuma et al. | |
| 7,678,271 B2 | 3/2010 | Curtin | |
| D656,800 S | 4/2012 | Lee et al. | |
| 8,215,230 B2 * | 7/2012 | Curtin | F26B 5/08 99/495 |
| D777,520 S | 1/2017 | Singlaub | |
| D779,886 S | 2/2017 | Singlaub | |
| 9,969,521 B2 | 5/2018 | Shen | |
| 2010/0072166 A1 | 3/2010 | Dickie | |
| 2011/0036806 A1 | 2/2011 | Gregg et al. | |
| 2011/0248037 A1 * | 10/2011 | Fung | B65D 21/0219 220/592.2 |
| 2011/0272419 A1 * | 11/2011 | Vanderberg | B65D 21/086 220/666 |
| 2012/0161408 A1 * | 6/2012 | Sidhu | A45C 5/14 280/47.38 |
| 2012/0205371 A1 | 8/2012 | Lee | |
| 2013/0032592 A1 | 2/2013 | Lee | |
| 2013/0048648 A1 * | 2/2013 | Robertson | F25D 3/06 220/592.02 |
| 2013/0075393 A1 | 3/2013 | Haynie | |
| 2013/0277364 A1 * | 10/2013 | Kusuma | A45F 3/20 220/8 |
| 2015/0291309 A1 * | 10/2015 | McGregor | A45C 7/0036 220/573.1 |

* cited by examiner

COLLAPSIBLE MULTI-PURPOSE CONTAINERS

CROSS REFERENCE TO RELATED APPLICATIONS

This application claims priority under 35 U.S.C. § 119 to German patent application DE 20 2014 101 048.3, filed Mar. 10, 2014, the entire contents of which are incorporated herein by reference.

FIELD OF THE INVENTION

The present invention relates to collapsible containers. More particularly, open-top, shape-retaining collapsible containers or vessels for indoor and outdoor use are provided, including collapsible coolers, fish bins, and wheeled vertical bins.

BACKGROUND OF THE INVENTION

It is desirable for containers designed for indoor and outdoor use to be rugged and strong, and in many cases thermally insulated and/or watertight. However, due to these needs, many existing containers for indoor and outdoor use, such as coolers, fish bins or totes, and vertical wheeled bins for trash, yard waste, compost, or recycling, are typically formed as a stiff or rigid one-piece body, which renders this type of container bulky and difficult to store or transport in a vehicle.

A need therefore exists for indoor and outdoor containers which, in addition to being durable, shape-retaining, and thermally insulated and/or watertight as desired, can also be expanded for use and collapsed to a compact state for storage or transport.

BRIEF SUMMARY OF THE INVENTION

The present invention provides watertight collapsible containers including coolers, fish bins, and wheeled vertical bins for indoor and outdoor use, each preferably provided with a respective outer shell and nestable insert container having a wall structure with a wider taper angle than the outer shell, with the dual benefits of partitioning the container space to separate different types of contents and providing an air space between the insert container and shell to serve as a thermally insulating layer between the interior of the insert container and the ambient outside the shell.

The outer shell is a collapsible shell having a top opening, a closed bottom, and a closed periphery defining a watertight shell volume disposed below the top opening. The collapsible shell comprises a generally annular top shell tier; a bottom shell tier including a generally horizontal support surface; and a collapsible wall section connecting the top shell tier to the bottom shell tier, the collapsible wall section including at least three stacked, generally annular tiers. At least one of the collapsible shell wall section tiers is a stiff middle shell wall section tier, and at least two of the collapsible shell wall section tiers are flexible and configured to fold between relatively expanded and relatively collapsed positions. At least one flexible shell wall section tier is disposed above the middle shell wall section tier, and at least one flexible shell wall section tier is disposed below the middle shell wall section tier. When a vertically compressive force is applied to the shell wall section, the middle shell wall section tier resists being folded or inverted, while a sufficient compressive force will invert or fold the flexible shell wall section tiers, or only a selected one or more of them, if the compressive force is applied only between the top and bottom ends of the tier desired to be folded or inverted. The size of the watertight shell volume can be increased by folding at least one of the flexible shell wall section tiers from a relatively collapsed to a relatively expanded position and can be decreased by folding at least one of the flexible shell wall section tiers from a relatively expanded to a relatively collapsed position. A lid removably engages the top shell tier to seal the collapsible insert container within a volume enclosed by the lid and the shell. The lid can fully enclose that volume whether or not the insert container is placed inside the shell.

At least one of the flexible shell wall section tiers adapted so that, when the bottom shell tier rests on a support surface in a substantially horizontal orientation, the tier is an stable in a relatively extended position and in a relatively collapsed position. More preferably, all of the flexible tiers have at least two stable states and exhibit "over-center" stability, tending to snap from any of a range of intermediate states to one or the other of two stable states defining the endpoints of the range, as determined by the relative proximity of the intermediate state to the two stable states.

Preferably, to facilitate snap-through movement between the folded and unfolded states, each flexible tier is provided with two living hinges comprising very narrow annular bands of flexible material, at which the material suddenly tapers down to a sharply reduced thickness, at the top and bottom ends of the flexible tier. Beyond the ends of the flexible tier, the material suddenly tapers back out to an increased thickness, and a wider (i.e., taller) band of the flexible material of increased thickness is disposed between each living hinge and the adjacent rigid tier of a different material, where applicable. In addition to facilitating snap-through movement between states, the thinned regions also permit each flexible tier to fold more compactly against adjacent tiers, promote stability in the folded state by minimizing forces tending to straighten the material at the bent region, and promote the formation of a folded crease at a precise, consistent location each time the tier is folded.

The insert container is an independently collapsible container that fits within the collapsible shell and, like the collapsible shell, has a top opening, a closed bottom, and a closed periphery defining a watertight insert volume disposed below the top opening. Further, the insert container is composed of tiers generally having analogous structure and function to those of the shell, so that it collapses and expands in a similar manner to the shell. One optional difference may be that the shell middle tier is formed of a rigid material (such as polypropylene, metal, or nylon) that is different from a flexible material (such as a silicone or a thermoplastic elastomer) used to make the flexible tiers, whereas the insert middle tier may be made from the same flexible material that is used to make its flexible tiers, simply made thicker and/or with a vertical orientation (or more nearly vertical than that of the flexible tiers) to resist folding or inversion in vertical compression.

Adjacent tiers of different materials may be joined together by overmolding and/or adhesive material applied between their opposed surfaces. In this regard, it will be appreciated that regardless of whether the middle tier is made of the same material as the flexible tiers, the top and bottom tiers are preferably formed of a different, rigid material, and must be joined in some way to their respective adjacent flexible tiers.

Forming the middle tier of a rigid material provides the benefit of added lateral compressive strength and resistance to deformation under lateral compressive loads. However, this attribute may not be important for the insert container, especially when it is disposed within the shell and the shell includes a rigid middle tier to help protect the insert container from side impacts and loads. Alternatively, the arrangement could be reversed, with the insert container including a rigid middle tier and the shell including a middle tier that is merely a stiff tier formed of a flexible or resilient material, the contents of the insert container being sufficiently protected by the rigidity of the middle tier of the insert container itself.

Preferably, the insert and shell are configured so that the insert can nest within the shell not only when both are in fully expanded positions, but also when both are in fully collapsed positions. In particular, a plurality of valleys formed between adjacent tiers of the insert in its fully collapsed position may simultaneously nest within a corresponding plurality of valleys formed between adjacent tiers of the shell in its fully collapsed position.

Collapsible container shells according to the invention are typically provided with handles to suit their purpose, as well as lids, which may be separate or pivotally connected to the top tier of the container shell. In some cases, it may be desirable for the insert container to be provided with its own lid in addition to the lid that covers the container shell. For example, in the case of a fish bin, an insert container lid may help to contain the odor of fresh-caught fish.

According to another aspect of the invention, a collapsible mobile container is provided. The collapsible mobile container includes a collapsible shell, and optionally a collapsible insert container as well, substantially as described above. A wheel (and typically at least two of them) connected to the shell bottom tier permits rolling movement of the container along a generally horizontal supporting surface. Preferably, the mobile container includes an elongate bracing member movably connected to the top shell tier for movement between a generally horizontal stowed position and a bracing position, in compression between the shell top tier and the shell bottom tier, to inhibit collapsing movement of the shell top tier towards the shell bottom tier.

In a particular embodiment, one end of the bracing member is pivotally connected to the top shell tier about a horizontal axis, and an opposite end of the bracing member in the bracing position having a connector removably mated to a corresponding connector in fixed relation to the shell bottom tier, when the shell is in an expanded position. Further, a handle may be connected to the shell top tier proximate to the location of an end of the bracing member braced against the shell top tier. This will serve to ensure that pushing forces applied through the handle to move the container will generally be borne by the bracing member, thus inhibiting the pushing forces from causing the container to collapse. In one example, the handle and the end of the bracing member are pivotally connected to the shell top tier about a common horizontal axis.

According to still another aspect of the invention, a method of using containers according to the invention as coolers is provided. The method includes providing a collapsible cooler including a collapsible shell and a collapsible insert nested within the shell, the shell and insert having structural and functional attributes substantially as described above. A cold substance is placed anywhere within the shell volume, either inside the insert container or in the space between the outer surfaces of the insert container and the inner surfaces of the shell, an item to be cooled is placed within the insert container, and the lid is closed over the container shell. For example, the cold substance may be ice placed only within the insert container or only outside of the insert container, the water impermeability of the insert container keeping any liquid water from passing into or out of the insert container, to keep the interior surfaces of one of the nested containers dry. In another example, a certain type of contents to be chilled may be placed within the insert container, and another type of contents desired to be separated from the first type of contents may be placed in the space between the insert container and the shell.

DETAILED DESCRIPTION OF THE INVENTION

Figure 1:
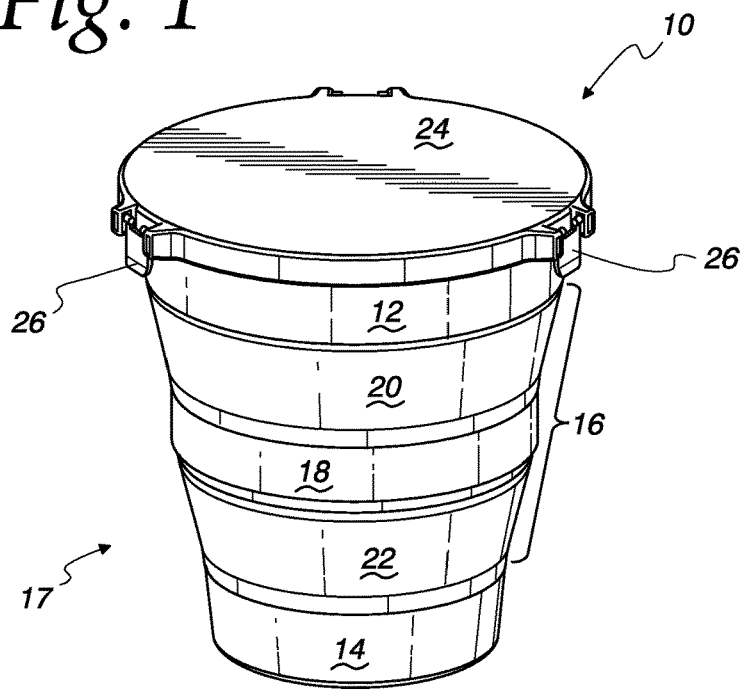
FIG. 1 is a perspective view of a collapsible cooler according to an aspect of the invention, in a fully expanded position.

Collapsible indoor and outdoor containers with improved shape retention and structural integrity in accordance with the present invention are described in this section, with reference to coolers 10, 10' depicted in FIGS. 1-17, a fish bin 44 depicted in FIGS. 18-27, and a wheeled vertical bin 78 depicted in FIGS. 28-35.

Turning to FIGS. 1-17, collapsible coolers (or ice chests) 10, 10' according to one embodiment of the invention are described and illustrated. Cooler 10 is illustrated as a multi-tiered container including a stiff or rigid top tier 12 defining a top opening 13 within its inner perimeter, a stiff or rigid bottom tier 14, and a collapsible wall section 16 connecting top tier 12 to bottom tier 14, tiers 12 and 14 and collapsible wall section 16 combining to form a cooler shell 17. Collapsible wall section 16 may be collapsed and expanded to vary the overall height dimension of cooler shell 17 and thus the available volume within cooler shell 17 for food, beverages, or other contents to be kept cool. Wall section 16, in turn, includes a stiff or rigid middle tier 18 between two flexible tiers 20 and 22. Additional tiers may be included in the collapsible wall section, preferably adhering to the alternating arrangement in which a flexible tier is connected above and below each stiff or rigid tier. Each tier of cooler shell 17 is imperforate, and the attachment regions joining neighboring tiers are water impermeable, so that cooler shell 17 is adapted to retain water or other liquids in its interior volume, generally defined as the space above the interior bottom surface of bottom tier 14 and below top opening 13. Advantageously, this permits cooler shell 17 to be partially filled with ice, to keep its other contents cold, without leaking liquid water when the ice melts.

Figure 2:
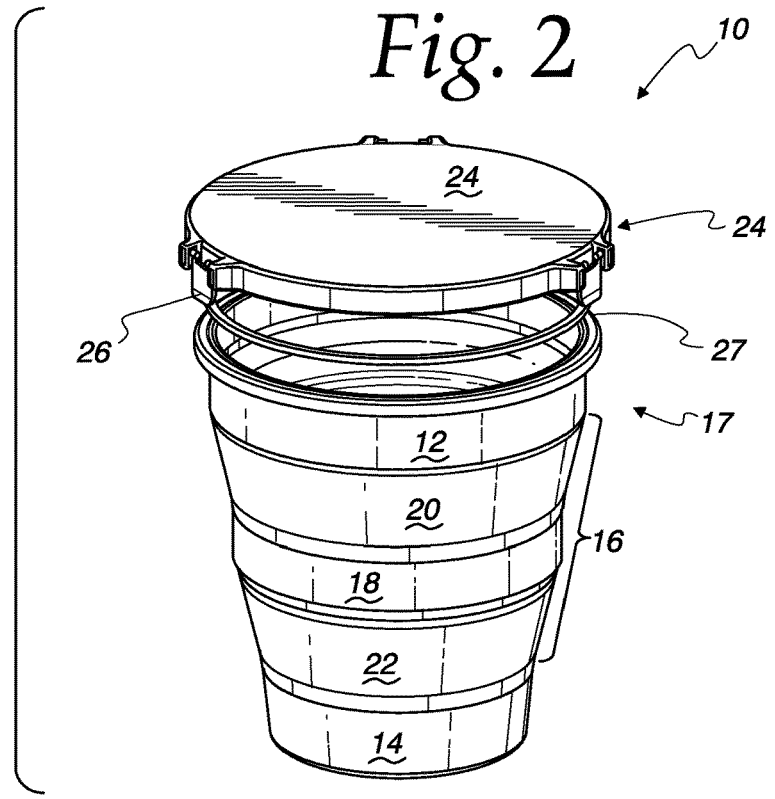
FIG. 2 is an exploded perspective view of the cooler shown in FIG. 1
Figure 3:
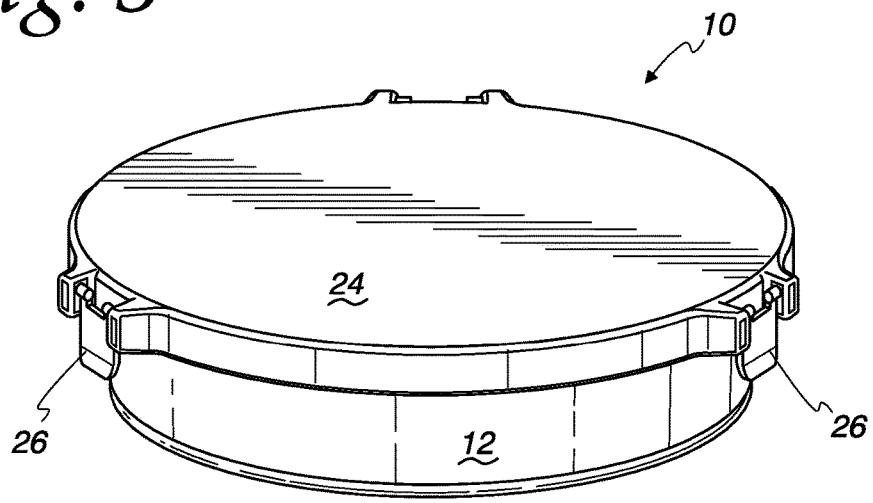
FIG. 3 is a perspective view of the cooler shown in FIG. 1, in a fully collapsed position.
Figure 4:
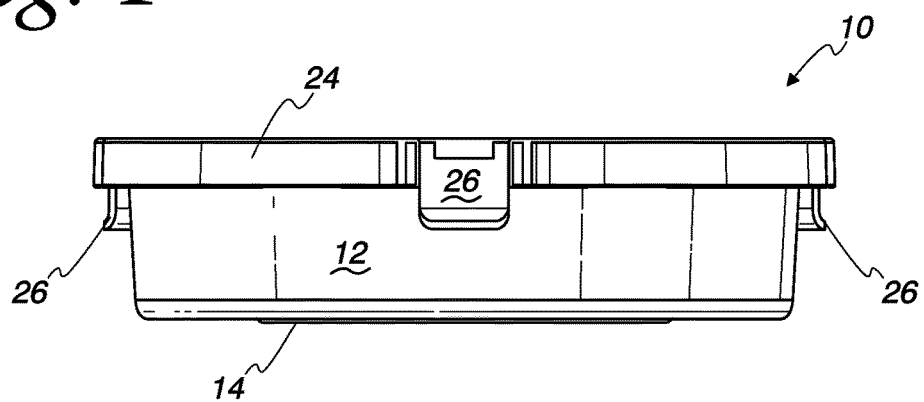
FIG. 4 is a side elevation view of the cooler shown in FIG. 1, in a fully collapsed position.
Figure 5:
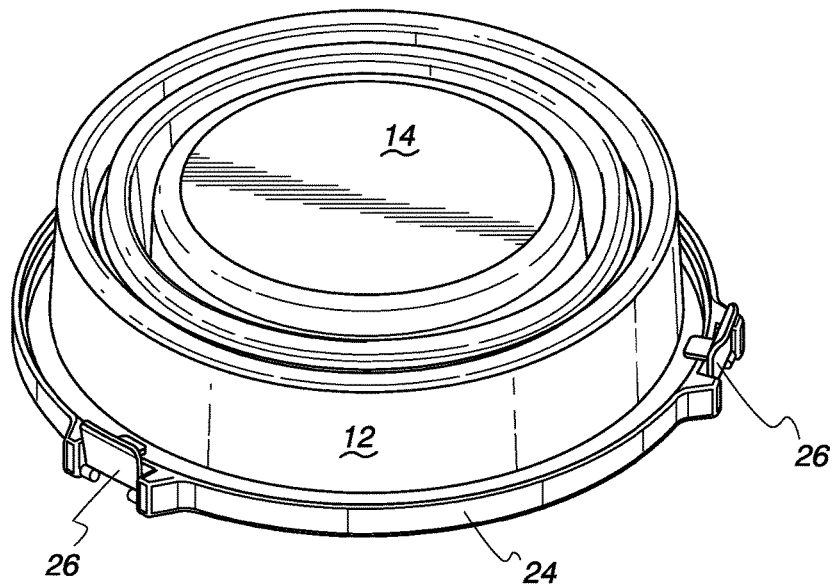
FIG. 5 is an inverted perspective view of the cooler shown in FIG. 1, in a fully collapsed position.
Figure 6:
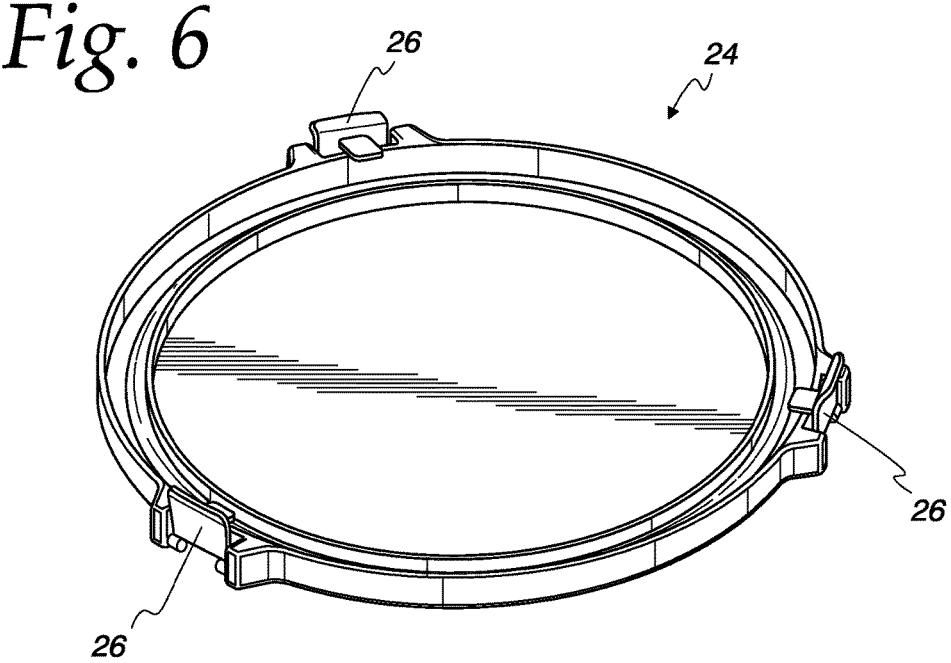
FIG. 6 is an inverted perspective view of a lid of the cooler shown in FIG.
Figure 7:
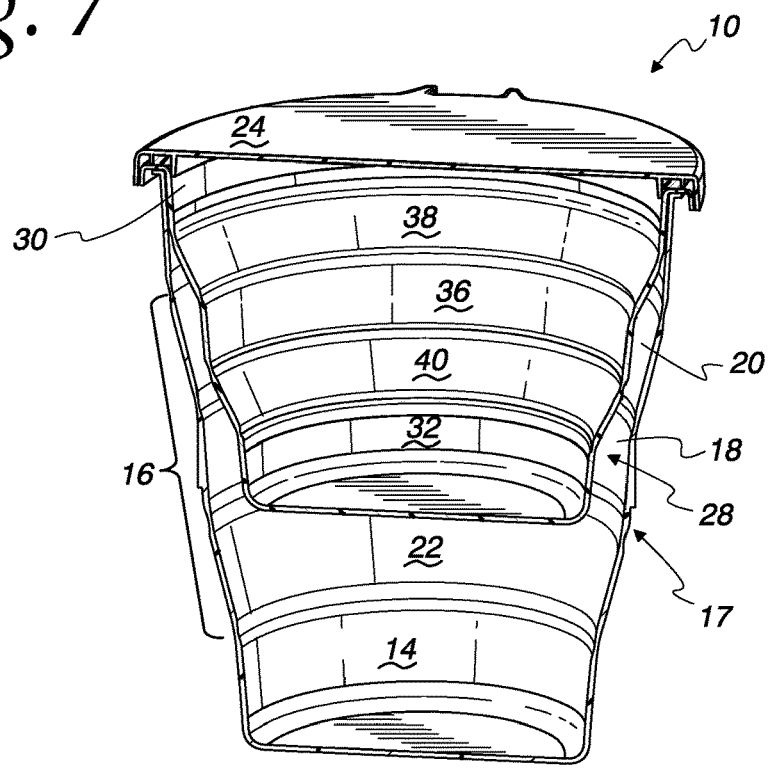
FIG. 7 is a cutaway perspective view of the cooler shown in FIG. 1.
Figure 8:
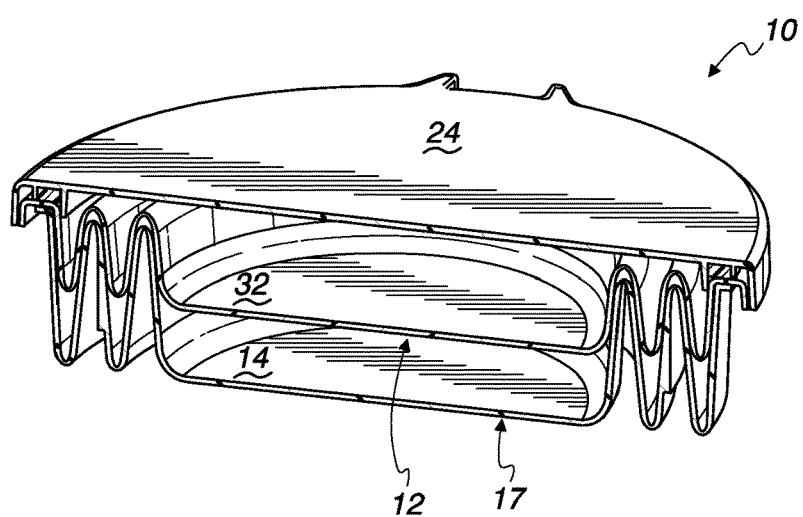
FIG. 8 is a cutaway perspective view of the cooler shown in FIG. 1, in a fully collapsed position.
Figure 9:
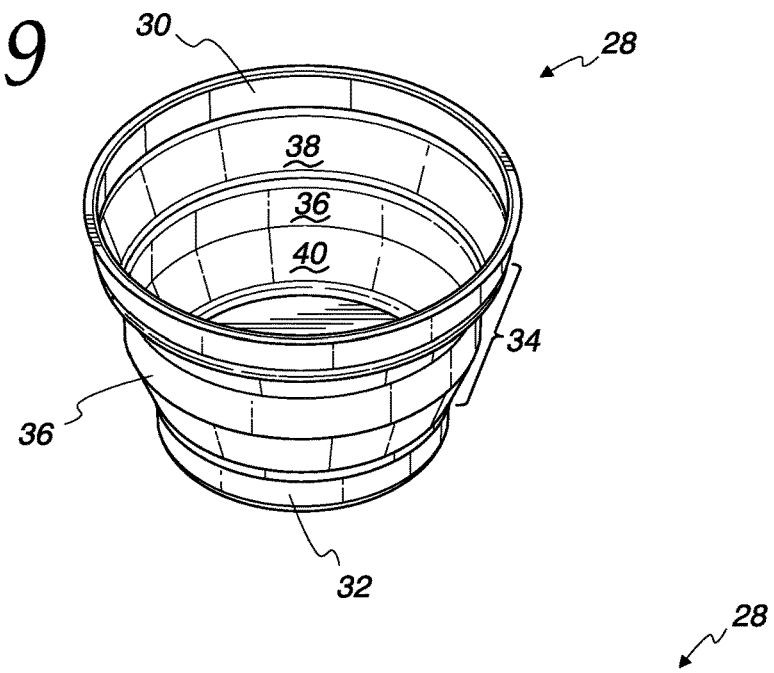
FIG. 9 is a perspective view of a collapsible cooler insert container of the cooler shown in FIG. 1.
Figure 10:
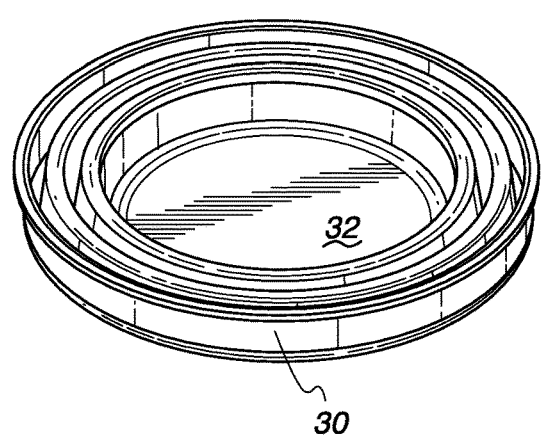
FIG. 10 is a perspective view of the insert container shown in FIG. 9, in a fully collapsed position.
Figure 11:
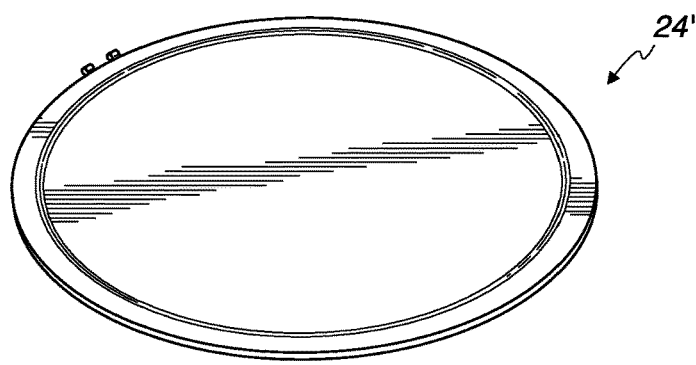
FIG. 11 is a perspective view of a pivotally connected lid of an alternative cooler of the invention.
Figure 12:
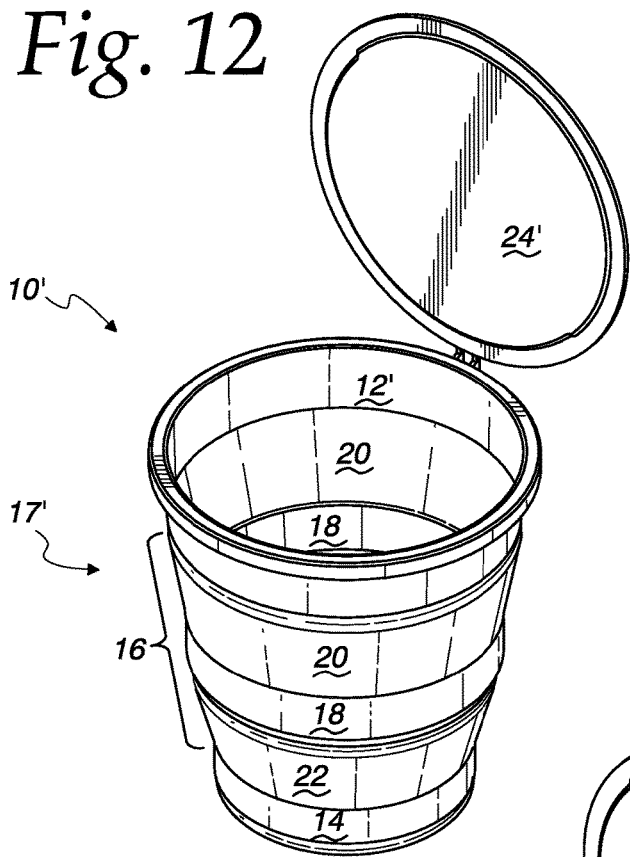
FIG. 12 is perspective view of an alternative cooler of the invention including the pivotally connected lid.
Figure 13:
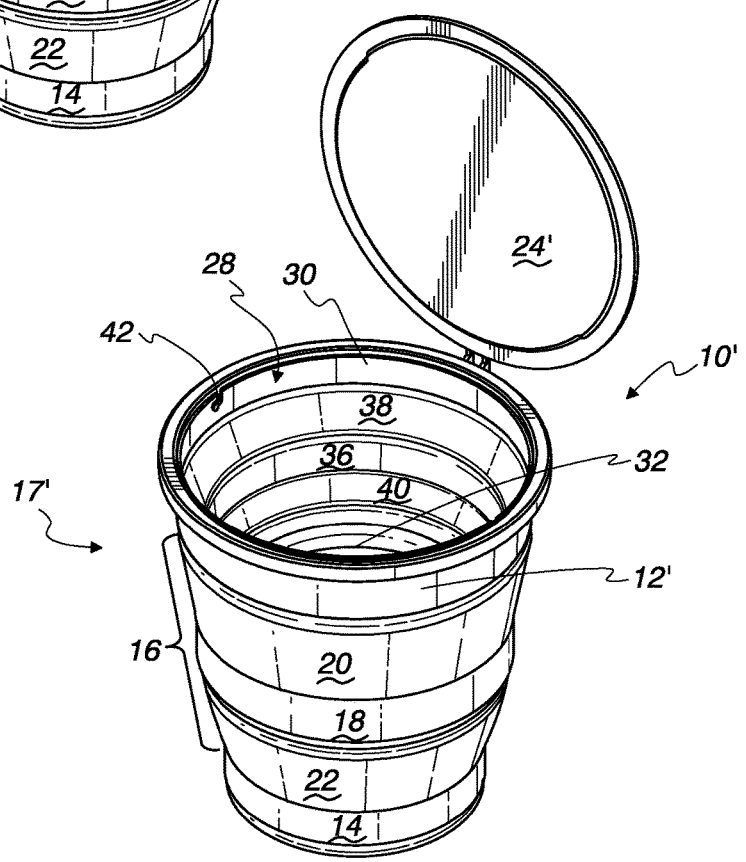
FIG. 13 is a perspective view of the alternative cooler shown in FIG. 12, including an insert container.
Figure 14:
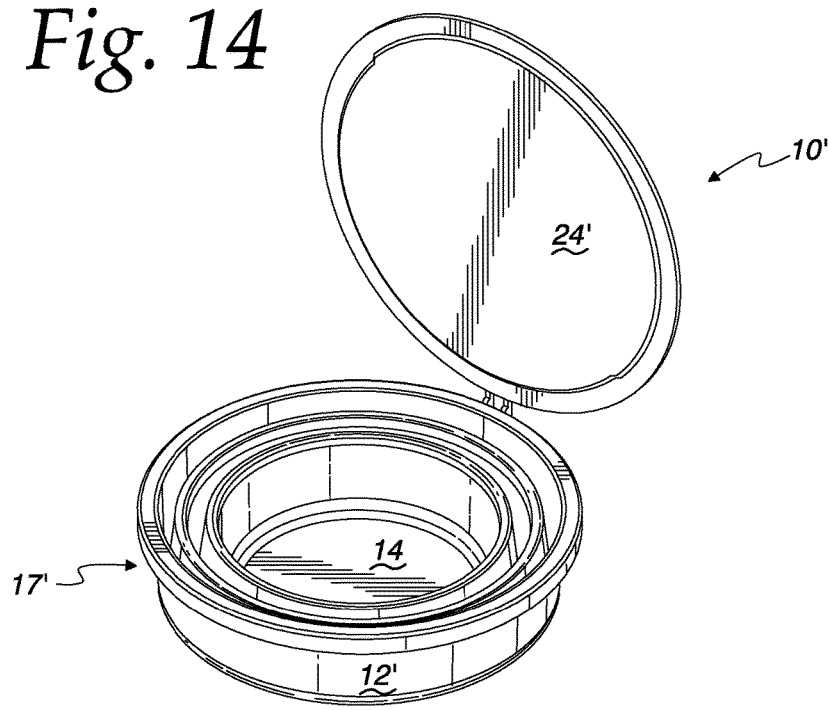
FIG. 14 is a perspective view of the alternative cooler shown in FIG. 12, in a fully collapsed position.
Figure 15:
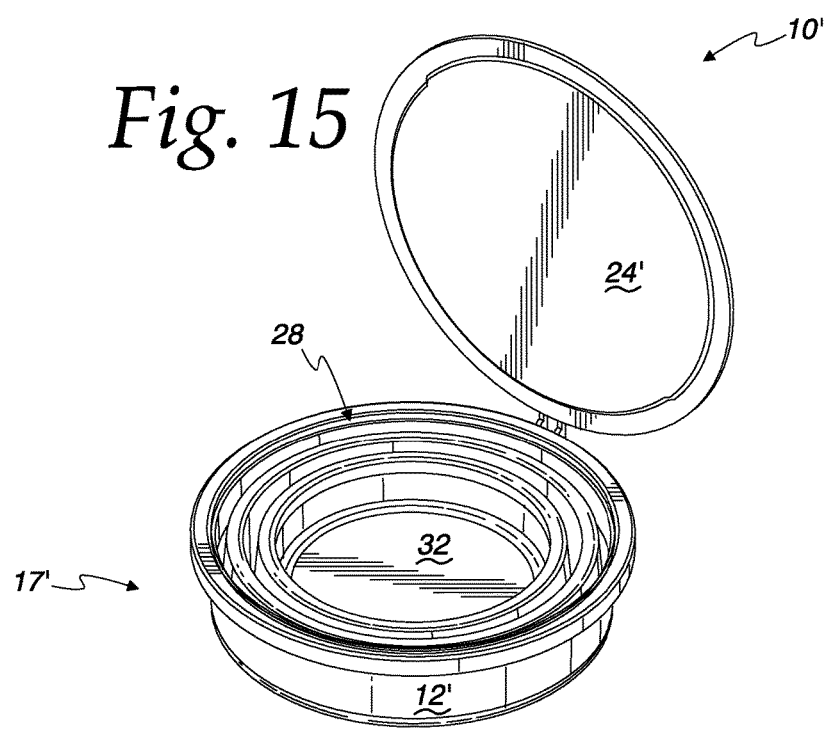
FIG. 15 is perspective view of the alternative cooler shown in FIG. 13, in a fully collapsed position.
Figure 16:
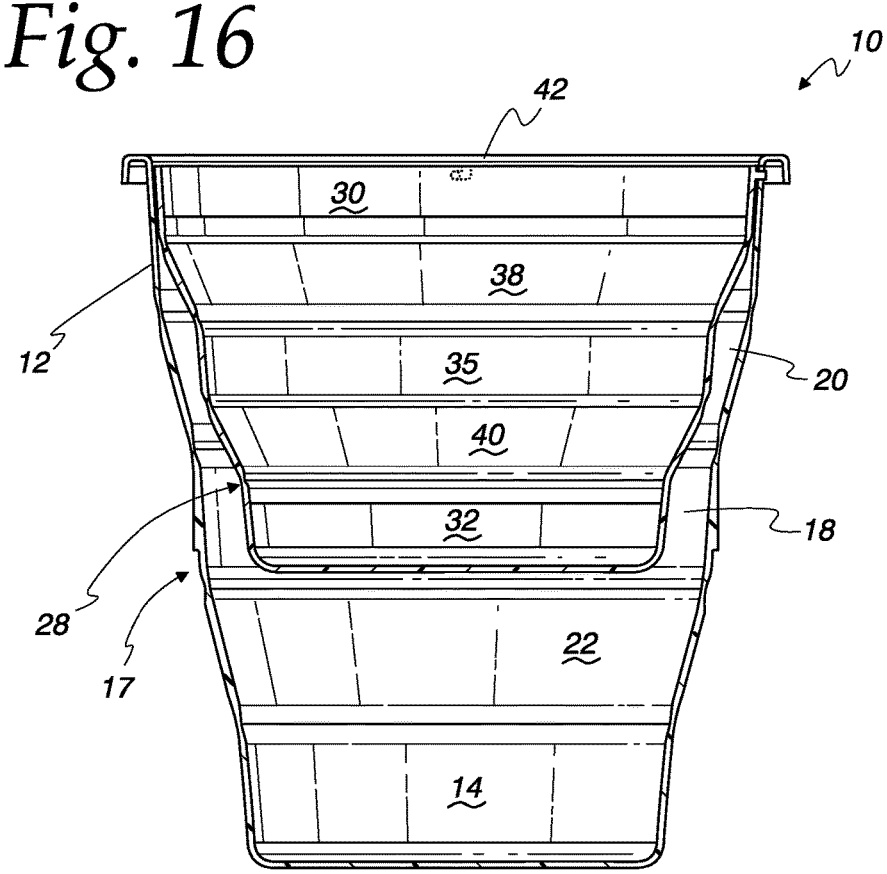
FIG. 16 is a cross-sectional side elevation view of the cooler shown in FIG. 1, with its lid removed.
Figure 17:
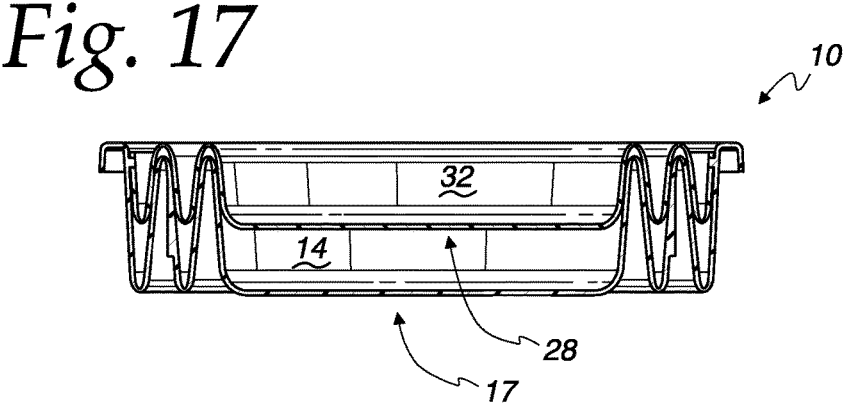
FIG. 17 is a cross-sectional side elevation view of the cooler as shown in FIG. 16, in a fully collapsed position.
Figure 18:
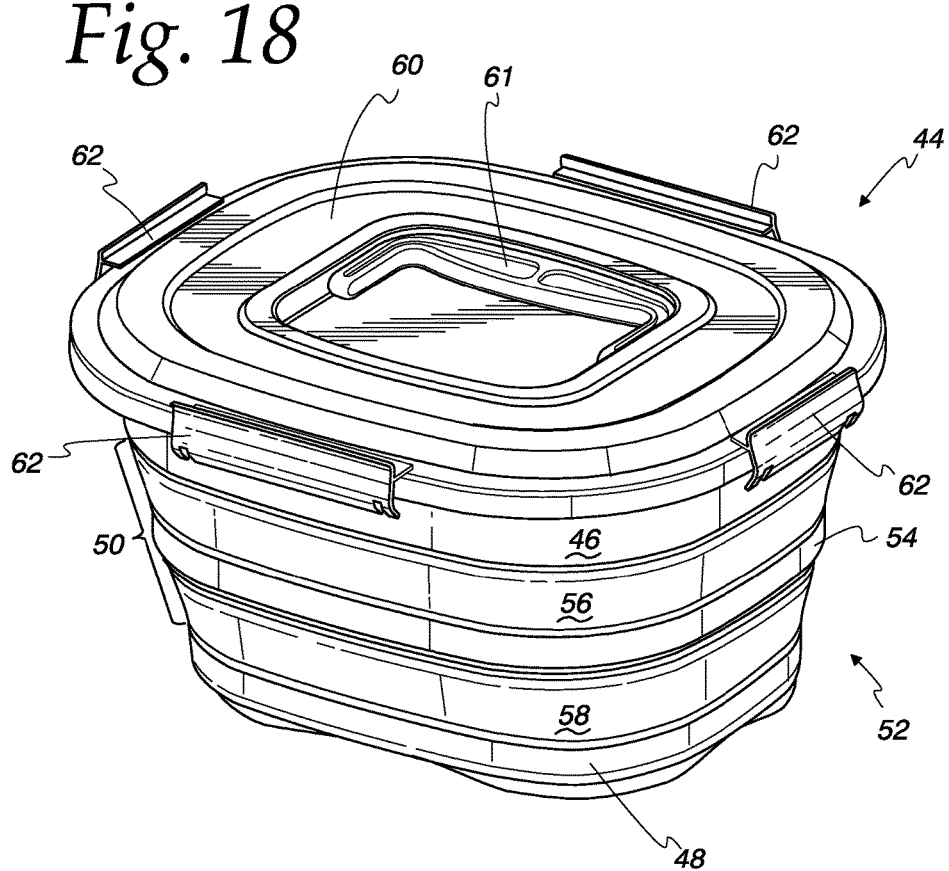
FIG. 18 is a high-angle perspective view of a collapsible fish bin according to another aspect of the invention, in a fully expanded position.
Figure 19:
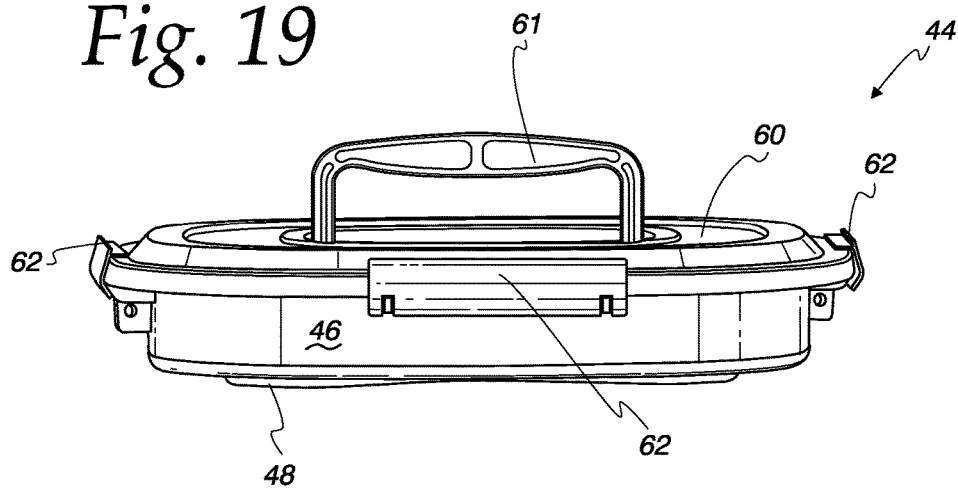
FIG. 19 is a low-angle perspective view of the fish bin shown in FIG. 18, in a fully collapsed position.
Figure 20:
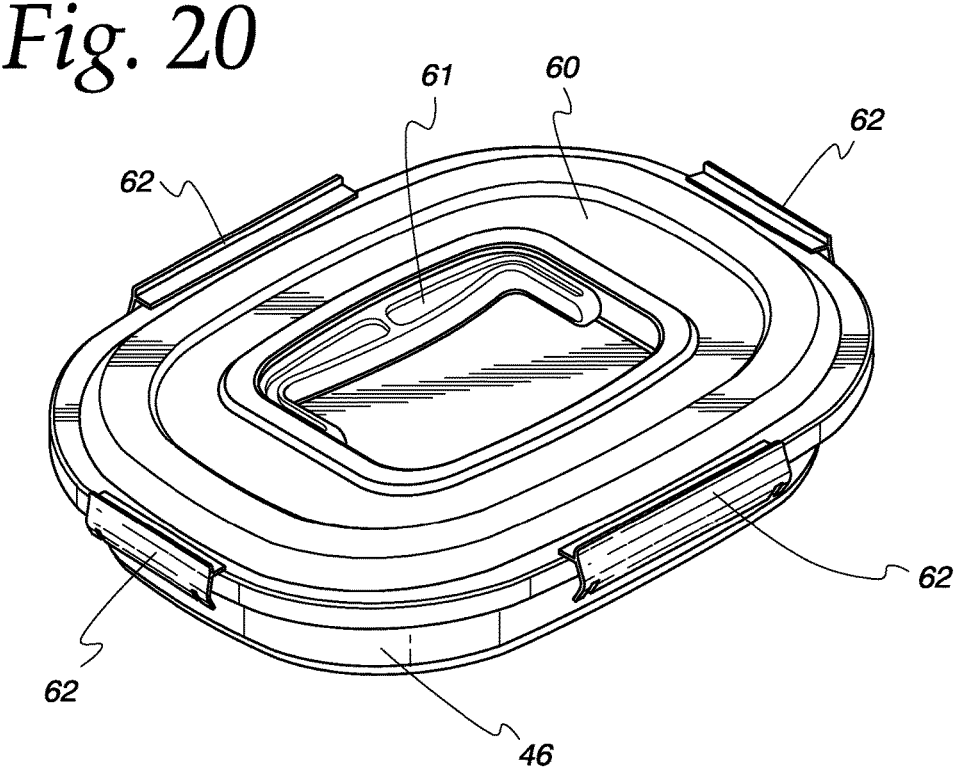
FIG. 20 is a high-angle perspective view of the fish bin as shown in FIG. 19.
Figure 21:
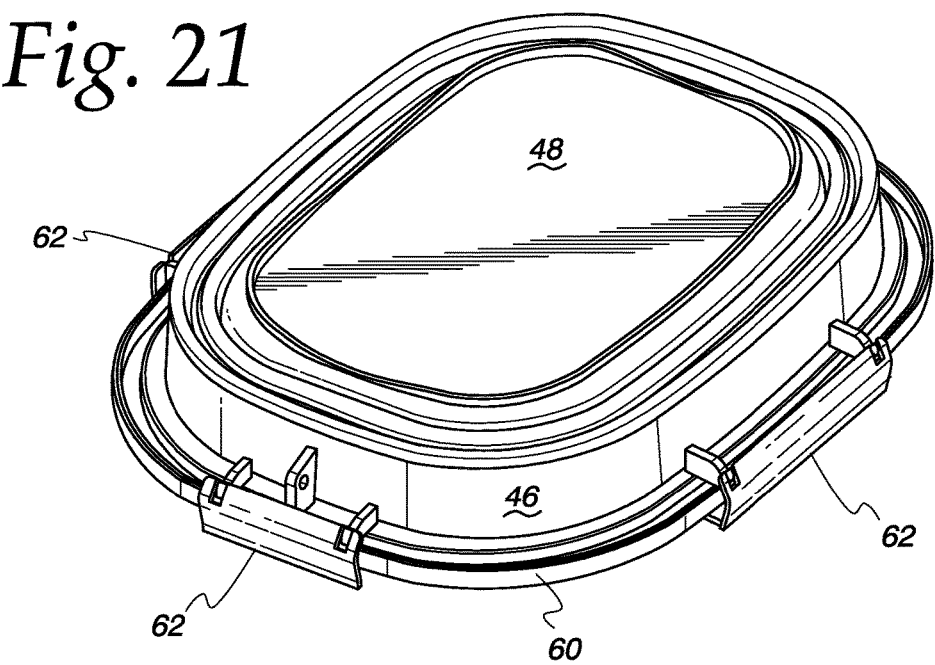
FIG. 21 is a bottom perspective view of the fish bin as shown in FIG. 19.
Figure 22:
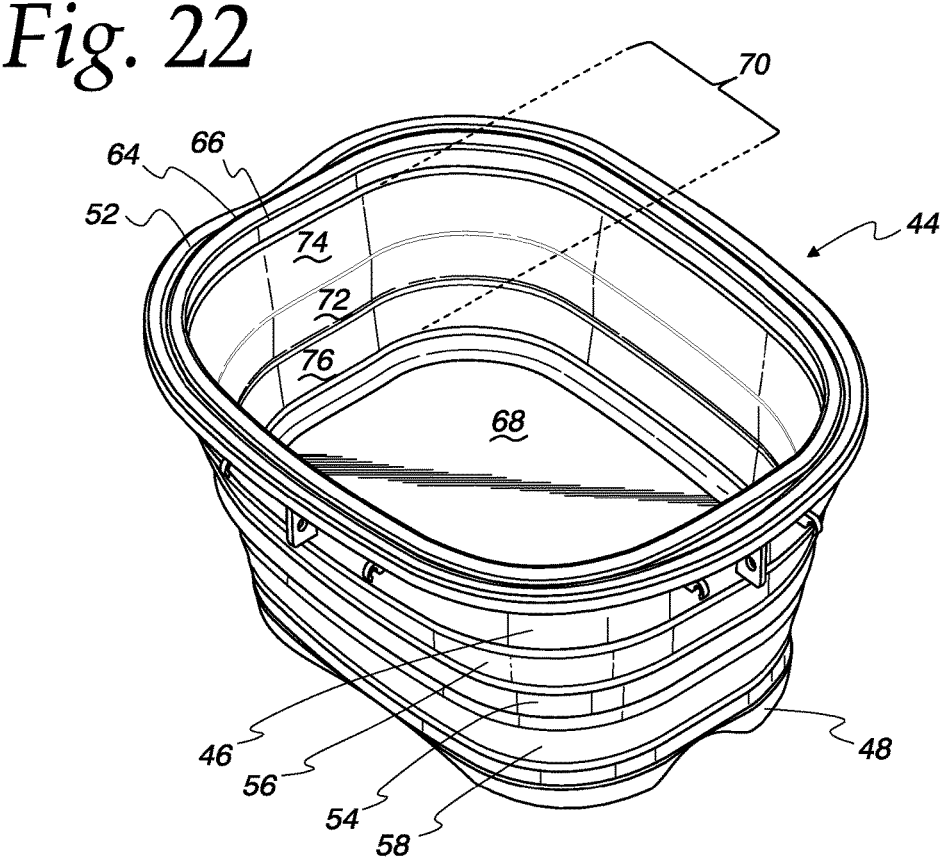
FIG. 22 is a perspective view of a fish bin as shown in FIG. 18 without a lid, showing an insert container nested within a shell.
Figure 23:
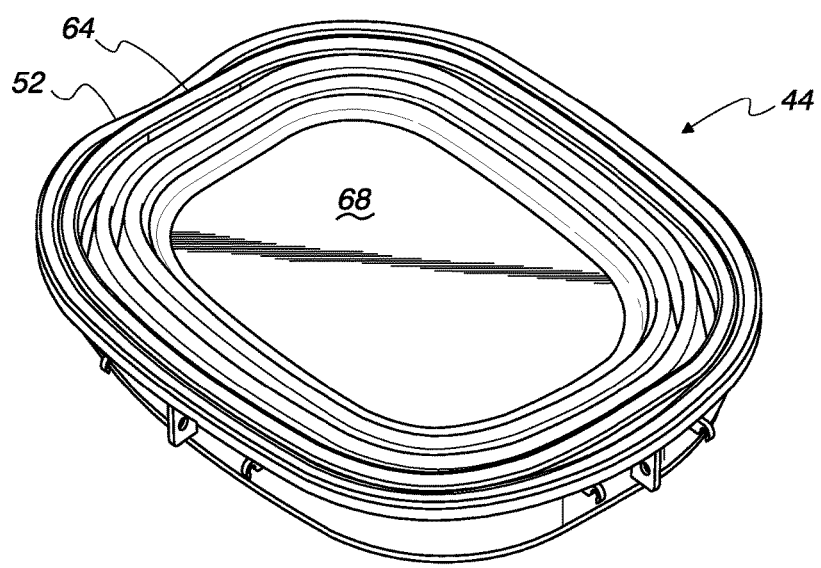
FIG. 23 is a perspective view of the fish bin as shown in FIG. 22, in a fully collapsed position.
Figure 24:
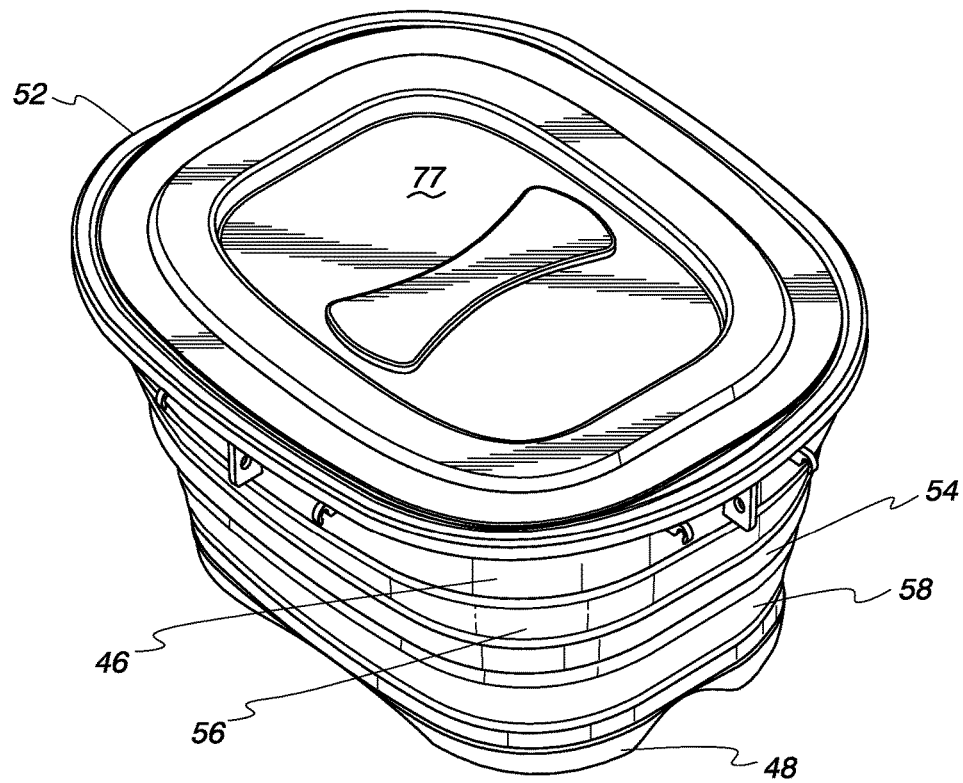
FIG. 24 is a perspective view of the fish bin as shown in FIG. 22, the insert container covered by an insert container lid.
Figure 25:
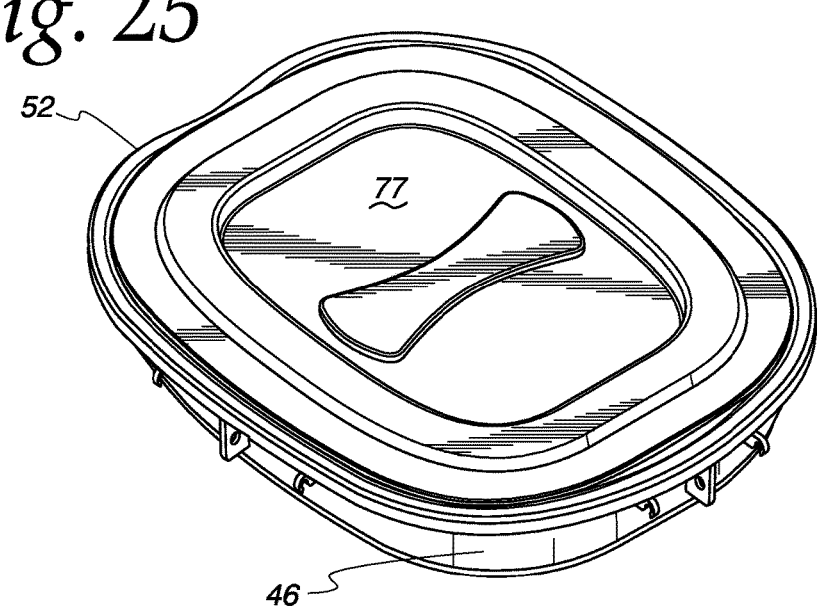
FIG. 25 is a perspective view of the fish bin as shown in FIG. 24, in a fully collapsed position.

Flexible tiers 20 and 22 are illustrated as having two stable positions, one unfolded and one folded, respectively corresponding to relatively expanded and collapsed states of cooler 10. A fully expanded state of cooler 10 is illustrated in FIGS. 1,2, and 7, showing both flexible tiers 20 and 22 in their unfolded positions, while a fully collapsed state of cooler 10 is illustrated in FIGS. 3-5 and 8, showing both flexible tiers 20 and 22 in folded positions. In its fully expanded state, cooler 10 provides its maximum volume capacity, while in its fully collapsed state, cooler 10 is at its most compact, which is particularly convenient for storage and transportation. At least two partially collapsed states of cooler 10 are also possible (not shown), in which only flexible tier 20 or only flexible tier 22 is folded, respectively. Each of flexible tiers 20 and 22 may be folded and unfolded separately and independently to transform the shape of cooler 10 to its fully expanded, fully collapsed, and two partially expanded states.

A lid 24 is provided together with cooler 10, configured to engage top tier 12 to enclose and optionally seal the interior volume of cooler shell 17. Lid 24 includes latches 26 which snap down to lock lid 24 onto top tier 12, and flip up to fully remove lid 24 therefrom. A sealing ring 27 composed of a resilient material may be provided to ensure a sealed closure of cooler shell 17 by lid 24. Sealing ring 27 may be a separate member or may be overmolded or adhesively bonded to either of lid 24 and top tier 12. An alternative embodiment of a collapsible cooler according to the invention is also provided, illustrated in FIGS. 12-15 as cooler 10', which differs from cooler 10 essentially only in that its lid 24' is permanently pivotally connected to a modified top tier 12' of its shell 17', rather than removably locking into place like lid 24. In other embodiments (not shown), a drain or spigot may be provided in bottom tier 14, either as a convenient means of emptying liquid water from melted ice used to chill other contents of the cooler, or as a means of dispensing ice water or other beverages directly from shell 17 into a cup, bottle, or other appropriate serving container.

As shown in FIGS. 5-10, 13, and 15-17, coolers 10 and 10' may both include a cooler insert container 28, which is itself a collapsible container mimicking the structure and collapsing and expanding behavior of cooler shells 17, 17', including a stiff or rigid top tier 30 connected to a stiff or rigid bottom tier 32 by a collapsible wall section 34, wall section 34 in turn including a stiff or rigid middle tier 36 and flexible tiers 38 and 40 located above and below middle tier 36. Insert container 28 fits inside cooler shell 17 by top insert tier 30 nesting within top tier 12, as best seen in the cross-sectional views of FIGS. 7 and 16. Like cooler shell 17, insert container 28 is preferably water impermeable, providing the option of placing ice between the walls of insert container and shell 17 to cool contents placed within insert container 28, while keeping those contents dry. Optionally, insert container 28 may be retained in its inserted position by a twist-lock mechanism such as the pin and slot coupling 42. Coupling 42 illustrates a benefit of the circular shape of cooler shell 17, 17' and insert container 28, permitting relative twisting of the two when they are nested; however, non-circular shapes may be preferred for other reasons and are also within the scope of the invention, in which case some other suitable locking mechanism or no locking mechanism may be employed to hold the insert container in place within the shell. In one embodiment, when insert container 28 in its expanded position is first placed inside cooler shell 17 in its expanded position as illustrated in FIG. 7, both containers may be collapsed together by simply applying a vertical compressive force between the top and bottom tiers of cooler shell 17, to produce the configuration shown in FIG. 8, in which the respective peaks and valleys of their wall sections are nested within each other. Alternatively, even if the containers are not adapted so that it is possible to collapse the nested expanded containers together in one motion, the two containers may be collapsed separately and only then nested together by aligning insert container 28 concentrically over cooler shell 17 and pressing it down so that the respective peaks and valleys of their wall sections nest within each other. In either case, the fully collapsed combination of cooler shell 17 and insert container 28 is rendered as compact or nearly as compact as cooler shell 17 collapsed by itself.

Insert container 28 may be used in several different ways in conjunction with cooler shell 17. For example, food items that are sufficiently lightweight so that the combined weight of insert container 28 and its contents does not cause cooler shell 17 to collapse may be placed inside insert container 28 disposed within an otherwise totally empty cooler shell 17, the air space between the walls of insert container 28 and cooler shell 17 advantageously providing thermal insulation to the interior of insert container 28. Alternatively, the space between insert container 28 and cooler shell 17 may be filled with ice, ice packs/cooler packs, and/or non-fragile food and beverage items such as bottled or canned drinks, meats, and/or cheeses, in which case the stiffness of the solid items and/or buoyancy of the liquid water disposed between the walls of the respective containers would help to prevent insert container 28 from collapsing wall section 34 of cooler shell 17, even with heavier items stored in it. Even in that case, it still may be advantageous to use insert container 28 to separate lighter or more fragile items, as lighter or more fragile items sharing an undivided space with heavier items, even if initially placed on top of the latter, could shift and settle during cooler transport, and thus risk being compressed between or under heavier items and potentially damaged or ruined. Another benefit of compartmentalized cooler space is the ability to avoid strong-smelling foods imparting their smells to other foods stored in the cooler.

Turning to FIGS. 18-27, a collapsible fish bin 44 according to another aspect of the invention is illustrated. Fish bin 44 includes structural components analogous to cooler 10, its principal difference from cooler 10 being its broad rectangular shape and relatively short vertical dimension. This shape is well adapted to the setting of a fishing boat, as a low center of gravity and broad base help to prevent the fish bin 44 from tipping over when the boat is rocked by waves. Moreover, unlike in cooler 10, vertically compartmentalized storage space to separate different contents to be cooled is typically unnecessary for a fish bin, as fish bin 10 will generally be used to store only one thing, fresh caught fish.

Figure 26:
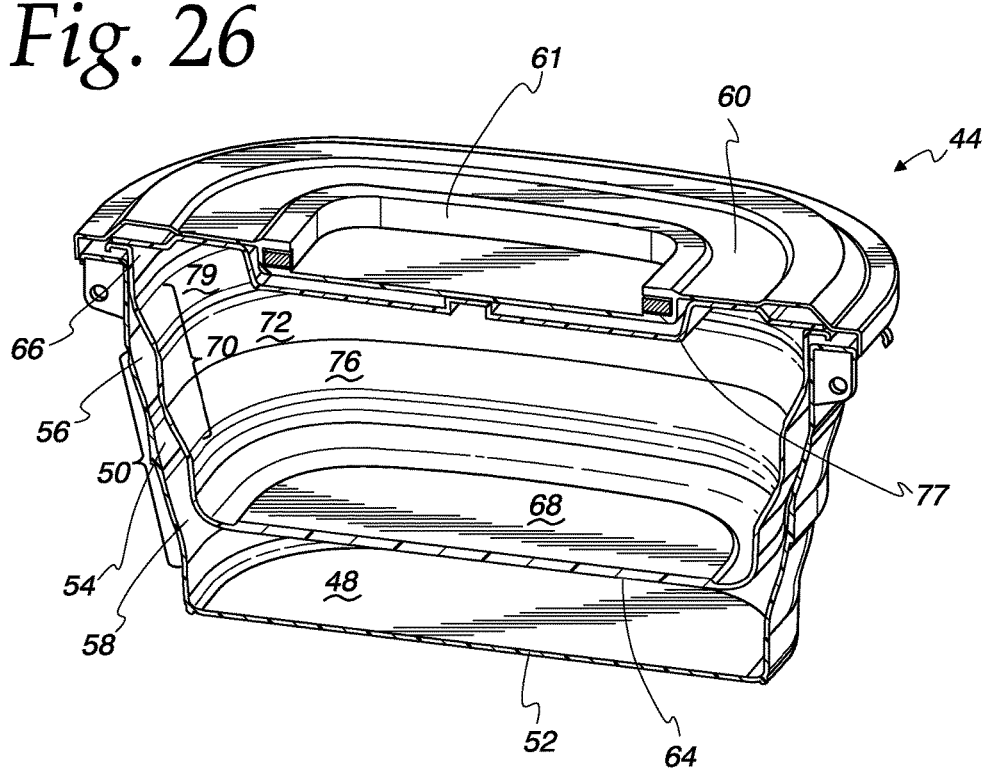
FIG. 26 is a cutaway perspective view of the fish bin shown in FIG. 18.
Figure 27:
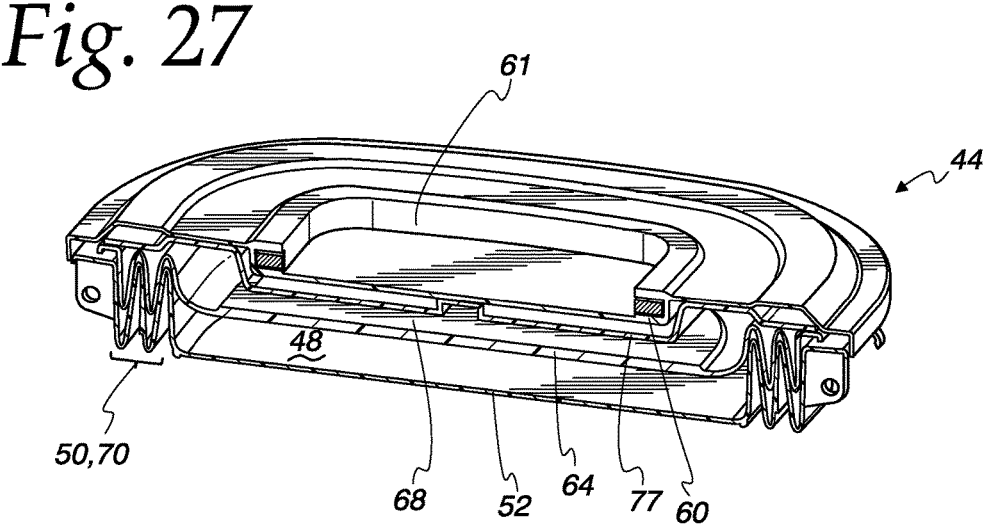
FIG. 27 is a cutaway perspective view of the fish bin shown in FIG. 18, in a fully collapsed position.
Figure 28:
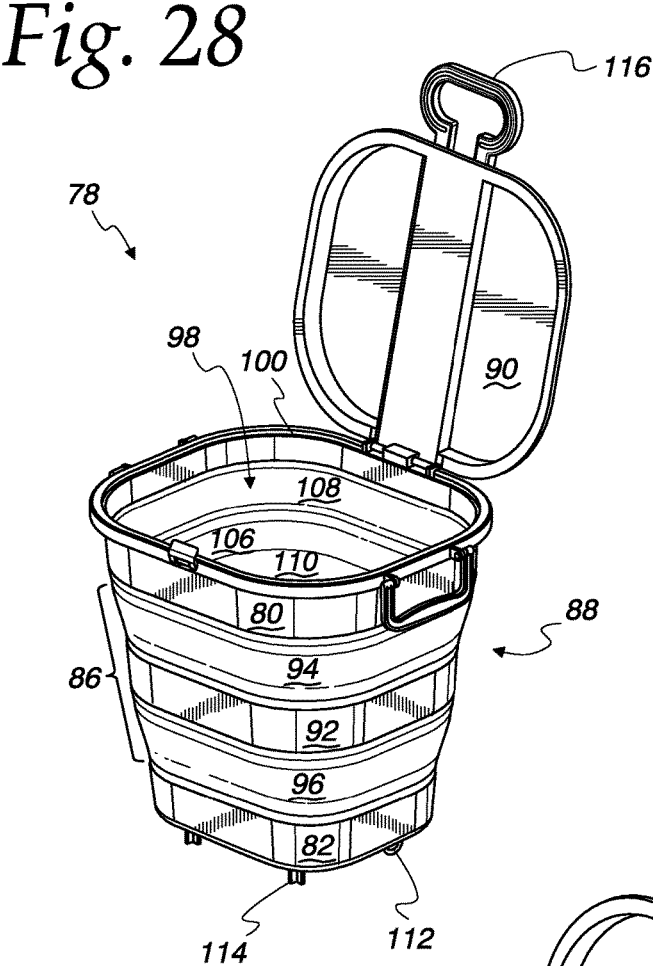
FIG. 28 is a front-top perspective view of a collapsible wheeled bin according to another aspect of the invention, in a fully expanded position.
Figure 29:
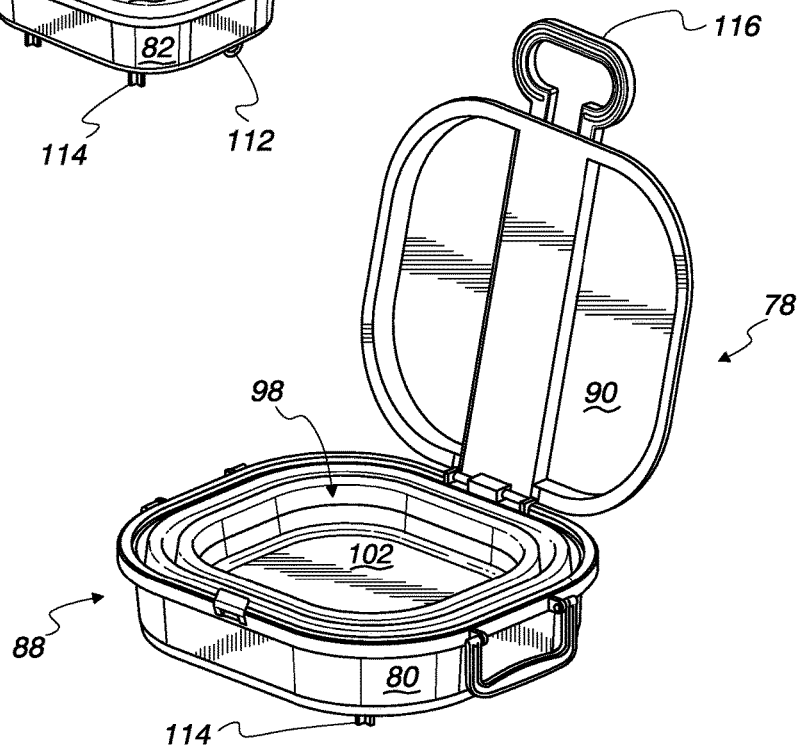
FIG. 29 is a perspective view of the wheeled bin shown in FIG. 28, in a fully collapsed position.

Like cooler 10, fish bin 44 is illustrated as a multi-tiered container including a stiff or rigid top tier 46 a stiff or rigid bottom tier 48, and a collapsible wall section 50 connecting top tier 46 to bottom tier 48, tiers 46 and 48 and collapsible wall section 50 combining to form a fish bin shell 52. Collapsible fish bin wall section 50 includes a stiff or rigid middle tier 54 between two flexible tiers 56 and 58. Also, similarly to cooler 10, fish bin 44 includes a lid 60, with an inset pivotal carrying handle 61, securable to top tier 46 by a plurality of locking clasps 62 (which may be attached either to top tier 46 as shown or to lid 60), as well as a nestable insert container 64 including a stiff or rigid top tier 66 connected to a stiff or rigid bottom tier 68 by a collapsible wall section 70, wall section 70 in turn including a stiff middle tier 72 and flexible tiers 74 and 76 located above and below middle tier 72. Optionally, as shown in the illustrated embodiment, fish bin insert container 64 includes its own lid 77 with a shape complementary to that of lid 60 to facilitate compact nesting of the lids as illustrated in FIGS. 26 and 27. The space between the walls of insert container 64 and fish bin shell 52 advantageously provides a thermally insulating barrier between the interior of insert container 64 and the ambient air. In use of fish bin 44, ice or cold water may be provided only in the space between the nested container walls, or between the walls as well as inside insert container 64.

Turning to FIGS. 28-35, a vertical wheeled bin 78 according to another aspect of the invention is illustrated. Wheeled bin 78 is useful either as a waste bin (e.g., for trash, recyclables, or compost) or, like cooler 10 and fish bin 44, for providing a thermally insulated compartment for chilling contents or keeping contents cold. Like coolers 10, 10' and fish bin 44, wheeled bin 78 is illustrated as a multi-tiered container including a stiff or rigid top tier 80 a stiff or rigid bottom tier 82, and a collapsible wall section 86 connecting top tier 80 to bottom tier 82, tiers 80 and 82 combining with collapsible wall section 86 to form a wheeled bin shell 88, and like cooler 10', wheeled bin 78 includes a lid 90 pivotally connected to top tier 80 and cooperating therewith to open and close an interior volume defined by wheeled bin shell 88. Collapsible wheeled bin wall section 86 includes a rigid middle tier 92 between two flexible tiers 94 and 96.

Like the coolers and fish bin described and illustrated above, wheeled bin 78 includes a nestable insert container 98 for its mode of use as a cooler, insert container 98 including a stiff or rigid top tier 100 connected to a stiff or rigid bottom tier 102 by a collapsible wall section 104, wall section 104 in turn including a stiff or rigid middle tier 106 and flexible tiers 108 and 110 located above and below middle tier 106. The space between the walls of insert container 98 and wheeled bin shell 88 advantageously provides a thermally insulating barrier between the interior of insert container 98 and the ambient air. When wheeled bin 78 is used as a rolling cooler, such as for beverages and the like, ice or cold water may be provided only in the space between the nested container walls, or between the walls as well as inside insert container 98.

Wheeled bin is illustrated as including two wheels 112 mounted to wheeled bin bottom tier 82 generally below a rear side of wheeled bin shell 88 and the pivotal connection of lid 90, and two stabilizing feet 114, which conveniently allows wheeled bin to be rolled by tipping it back onto wheels 112 and stably rested in a desired location by tipping it forward onto feet 114. Alternatively, instead of a single pair of wheels, a larger number of swivel casters (typically four, not shown) may be provided for rolling a collapsible wheeled bin without the need to tip it back, typically two or more of the swivel casters including a brake to stabilize the wheeled bin in a desired position.

Figure 30:
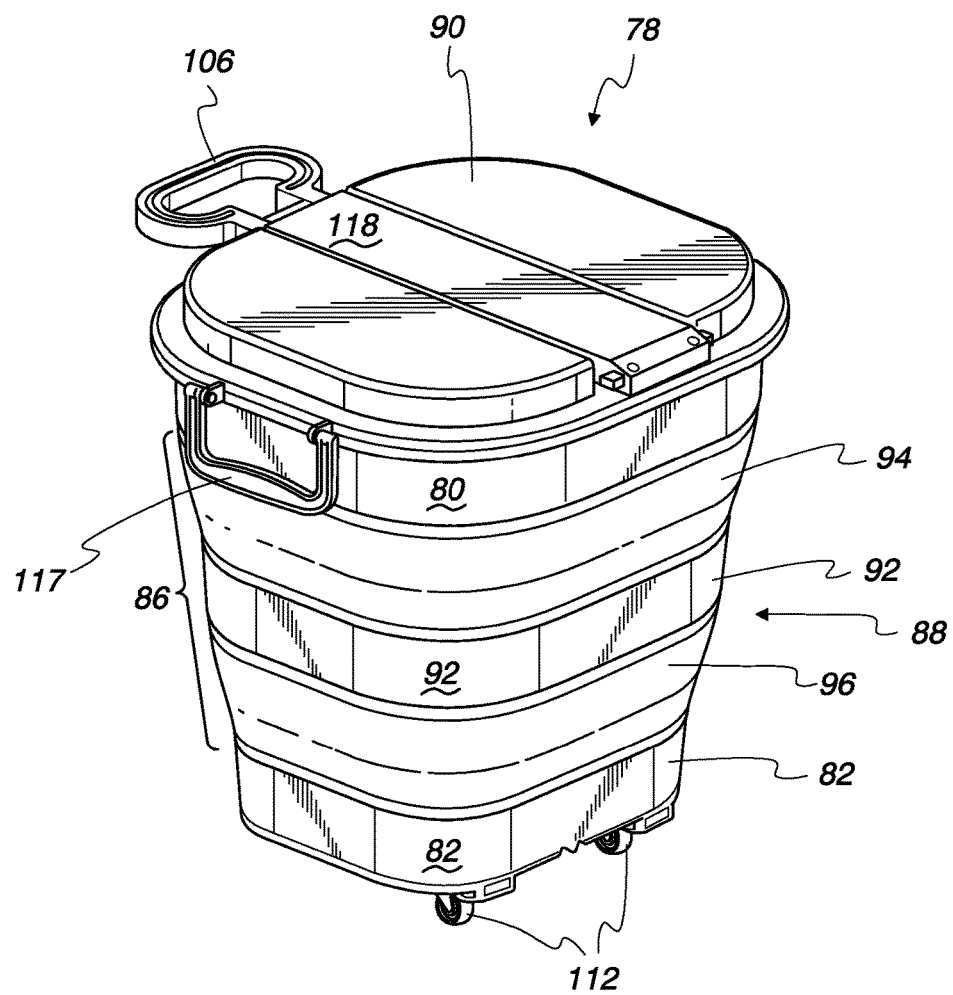
FIG. 30 is a rear-top perspective view of the wheeled bin shown in FIG. 28, with its pivotal lid in a closed position.
Figure 31:
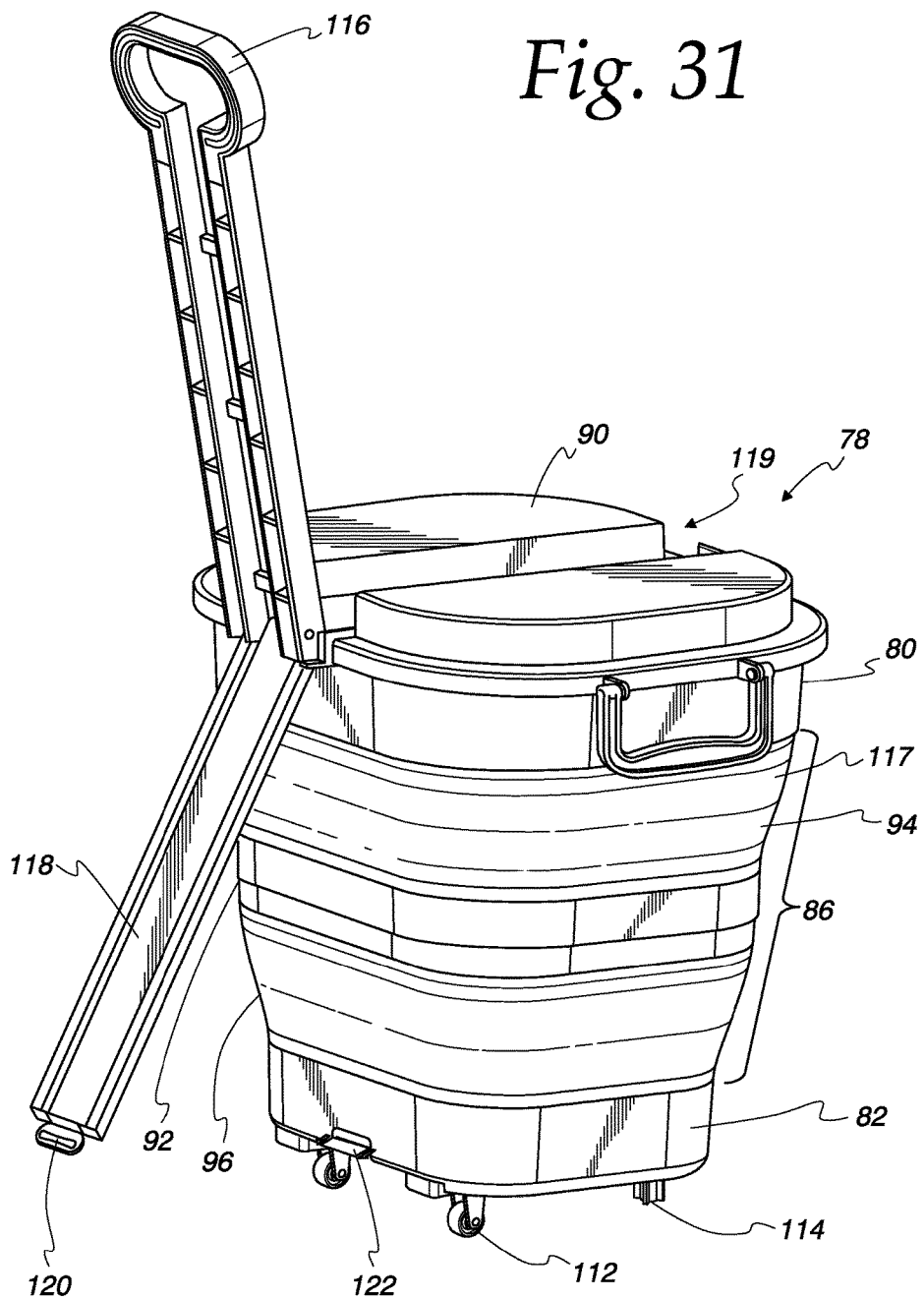
FIG. 31 is a rear-top perspective view of the wheeled bin shown in FIG. 28, illustrating a pivotal handle in a use position and a bracing panel rotated to a position between a stowed position and an engaged position.
Figure 32:
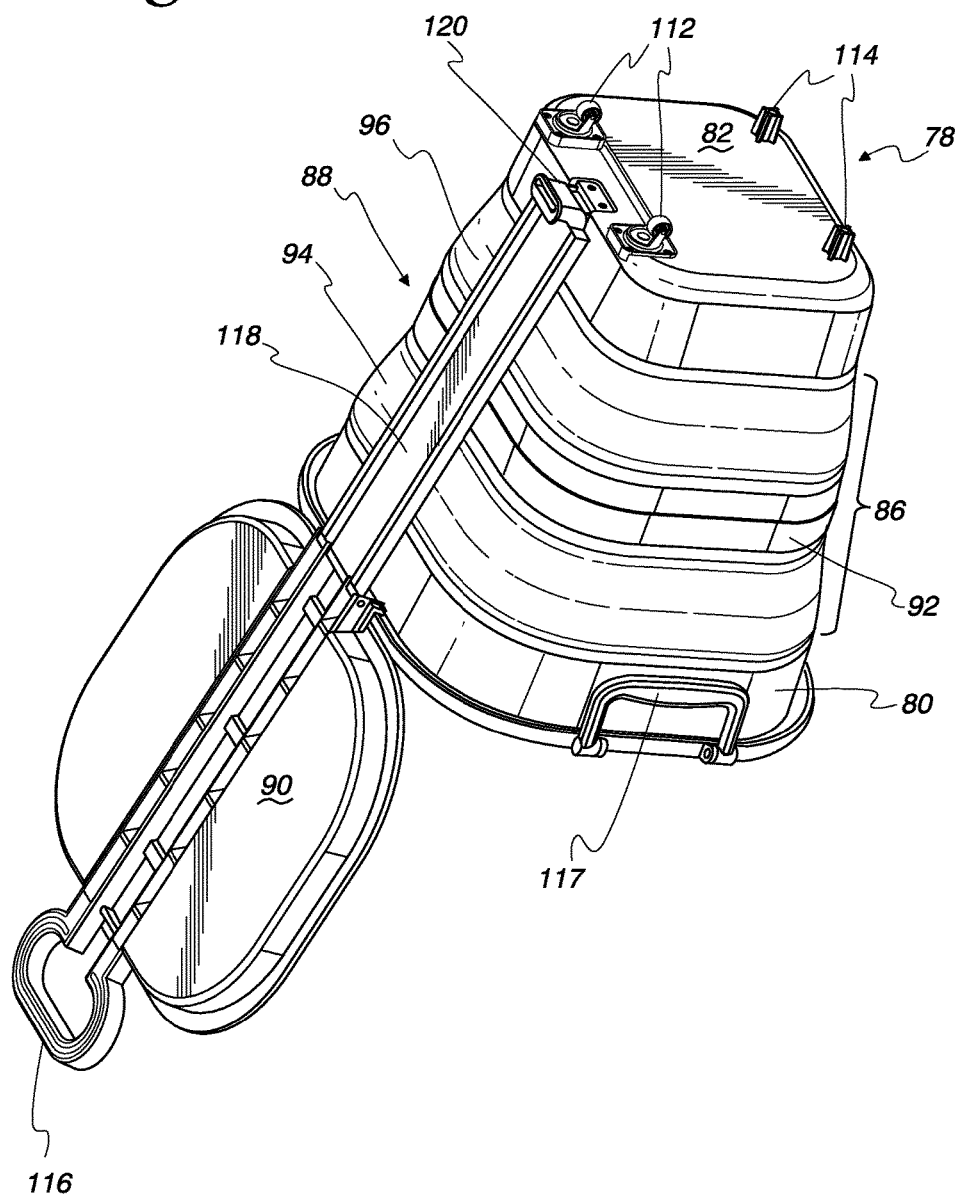
FIG. 32 is a rear-bottom perspective view of the wheeled bin shown in FIG. 28, illustrating the pivotal handle in a use position nested in the open lid of the bin, and the bracing panel in the engaged position.
Figure 33:
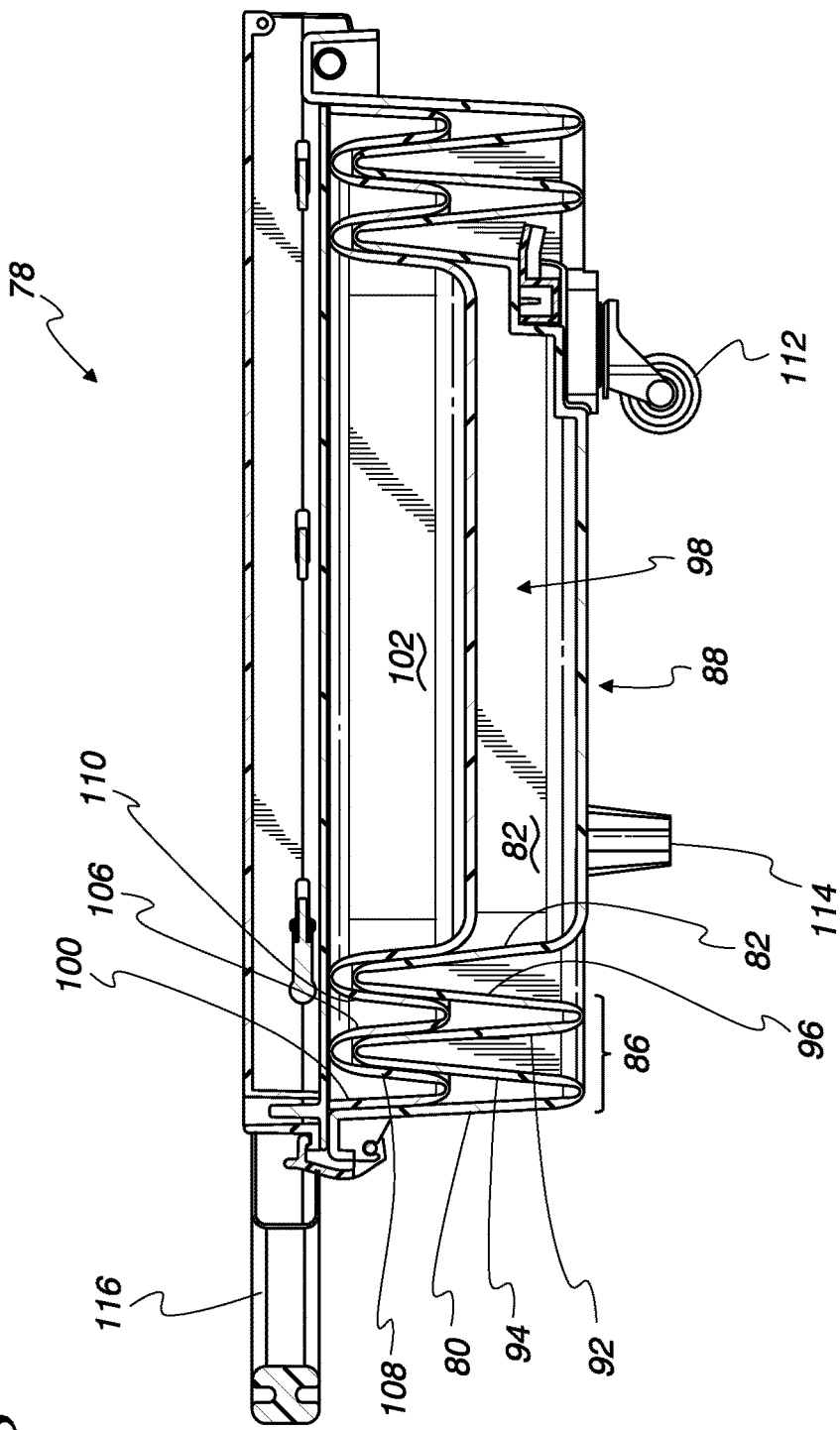
FIG. 33 is a cross-sectional side elevation view of the wheeled bin shown in FIG. 28, in a fully expanded position.
Figure 34:
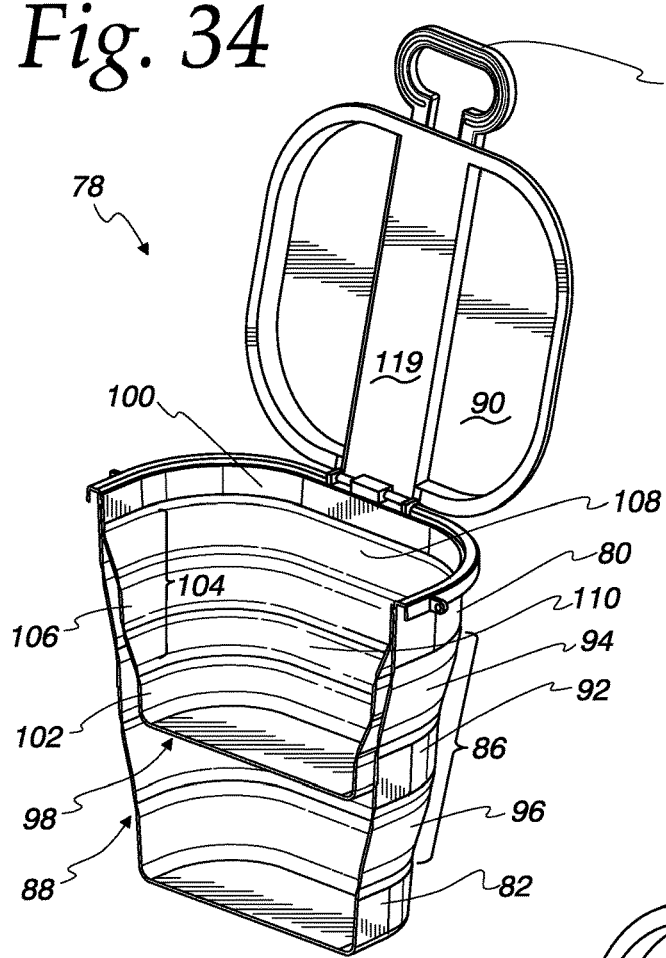
FIG. 34 is a front-top cutaway perspective view of the wheeled bin shown in FIG. 28.
Figure 35:
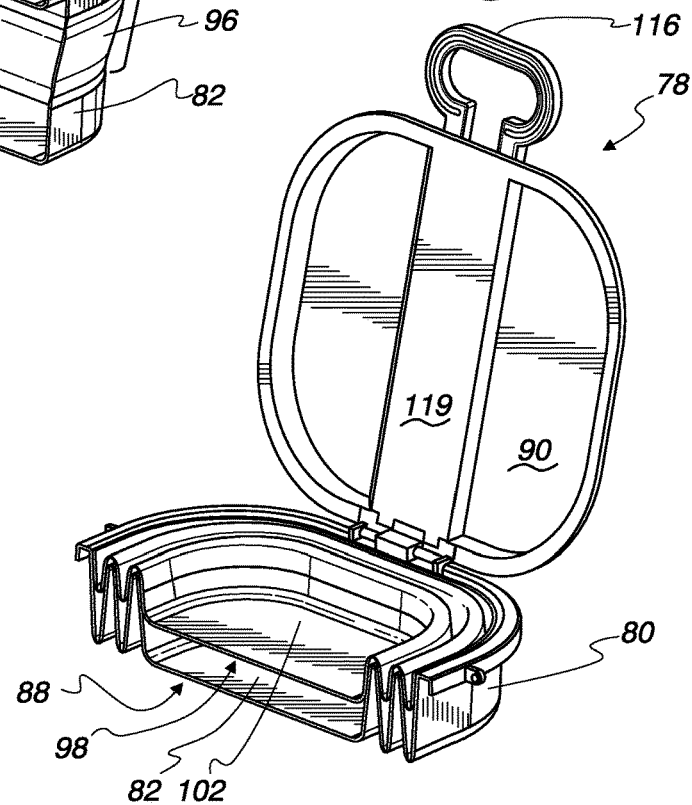
FIG. 35 is a front-top cutaway perspective view of the wheeled bin shown in FIG. 28, in a fully expanded position.

To facilitate rolling wheeled bin 78 across a generally horizontal floor or ground surface, a handle 116 is provided, side handles 117 also being provided to facilitate lifting and carrying wheeled bin 78. Handle 116 is pivotally connected to top tier 80 of wheeled bin 78 at the rear side of wheeled bin shell 88, corresponding to the location of wheels 112. Thus, handle 116 may be pivoted away from top tier 80, together with or separately from lid 90, to an operating position for pushing and pulling wheeled bin 78, such as that illustrated in FIGS. 28, 29, 31, 32, 34, and 35, for use in pushing or pulling wheeled bin 78, and toward top tier 80 when not in use, at which times it may be conveniently stowed within a depression 119 on the top side of lid 90 in its closed position, as illustrated in FIGS. 30 and 33. In embodiments of a wheeled bin including more than two casters for upright rolling, a pushing/pulling handle may be enabled to pivot to any angle relative to the top tier for comfortable pushing and/or pulling, the only constraints on its pivotal range of motion being impingement upon the top tier, at the end of what may be called its "forward" pivotal movement, or the rear side of the wheeled bin shell, at the end of its "rearward" pivotal movement.

For the illustrated two-wheeled embodiment, however, it is desirable to provide a hard stop to the pivotal range of motion of handle 116 away from top tier 8 at a convenient operative position for pushing or pulling the wheeled bin in a tipped-back orientation, such as a position generally in line with the taper inclination of wheeled bin 78, as shown in FIGS. 28, 29, 31, 32, 34, and 35, so that a user is provided leverage through handle 116 to facilitate tipping wheeled bin 78 back onto wheels 112 and to prevent wheeled bin from tipping forward to return to its upright orientation while being moved. However, even with a hard stop preventing further rearward pivotal motion of handle 116 beyond a use position relative to top tier 80, it may be difficult to prevent wheeled bin 78 from tipping backward during use beyond a comfortable rolling position, or even all the way to the ground on its rear side. This would particularly be the case when using handle 116 to push, thus tending to fold handle 116 forward (towards top tier 80). Thus, more preferably, handle 116 may be releasably locked in an operative angular position relative to top tier 80, restraining pivoting of handle 116 relative to top tier 80 in either direction away from the operative position.

Additionally, wheeled bin 78 is provided with a rigid bracing panel 118 to help stabilize wheeled bin 78 against inadvertent collapse or deformation of its flexible tiers during rolling movement, for example due to pushing and/or pulling forces applied through handle 116. Bracing panel 118 is pivotally connected to top tier 80 for rotation relative to top tier 80 about the same axis as handle 116, and when not in use, stows together with handle 116 within lid depression 119. For use, bracing panel 118 pivots away from top tier 80 until aligned generally parallel to a rear outer side of wheeled bin shell 88, and a connector 120 fixed at the opposite end of handle 116 from its pivotal axis is mated to a corresponding connector 122 fixed to wheeled bin shell bottom tier 82. Bracing panel connector 120 is illustrated as female and bottom tier connector 122 as male, but the relationship may instead be reversed or of a different type, provided that the connection is stably maintained (such as by an interference/friction fit) until deliberately disconnected by a user, and allows bracing panel 118 to be loaded in compression to resist collapsing movement of top tier 80 toward bottom tier 82. Advantageously, the particular mating relationship of connectors 120 and 122 illustrated in the Figures, in which male bottom tier connector 122 is a shaft surrounded on all sides by the sleeve of female bracing panel connector 120 along its entire small but appreciable length, also provides some resistance to angular movement of bottom tier 82 relative to bracing panel 118 by loading the union between bracing panel connector 118 and bracing panel 120 in bending. Thus, for example, when wheeled bin 78 is tipped back, the tendency of bottom tier 82 to settle towards a horizontal position, due to the weight of the contents of wheeled bin shell 88, is resisted by bending stresses between bracing panel 118 and bracing panel connector 120, thus at least partially relieving the tiers of wheeled bin shell 88 of stresses that would otherwise be produced to resist that settling tendency. It will also be understood that many other types of connectors other than the illustrated mating shaft and sleeve will also restrain pivotal settling movement of bottom tier 82, and any suitable connection between bracing panel 118 and bottom tier 82 is within the scope of the invention.

Of course, in the context of containers according to the present invention, as in common parlance, it will be understood that "stiff," "rigid," and "flexible" are relative terms. Thus unless further specified, referring to a tier of a wall structure as "stiff" herein simply means, at a minimum, that the tier is stiff enough to impart a force to its neighboring flexible tier or tiers sufficient to fold the flexible tier or tiers between relatively folded and unfolded stable positions (optionally causing the flexible tiers to "snap" between positions), without itself folding (i.e., without inverting its vertical orientation, with respect to the top and bottom of the container). On the other hand, a tier that is considered "rigid" for purposes of the invention typically will not even appreciably yield or deform, let alone fold, in the direction of the force imparted to fold the flexible tiers, in response to either that force or other typical loads associated with normal use of the container. Still further, a rigid tier preferably will not appreciably deform in any direction during normal use of the container. A "rigid" tier that exhibits the latter characteristic of not appreciably deforming in any direction is typically formed of a different material than the flexible tiers, rather than the same material in a different size or geometric configuration.

Although each flexible tier of the various indoor and outdoor containers described herein is illustrated as having only two stable positions, it is also within the scope of the invention to provide one or more flexible tiers having a plurality of stable partially expanded positions, for example by providing one or more flexible tiers having a stepped profile comprising a series of accordion-like pleats of flexible material, the pleats comprising peripheral bands of material oriented in alternating directions and connected to adjacent bands by living hinges, so that each pleat can be independently folded and unfolded (not shown), being stable in either state. Also, a wall structure of a container according to the invention need not have the exact shapes of the containers shown in the Figures, but may have any suitable shape, such as round, oval, rectangular with rounded corners, or other shape as desired. For example, successive accordion pleats may be stable in relatively "bent" orientations, in which part of the circumferential length of a pleat is folded and the remainder of the length is unfolded.

Indoor and outdoor containers according to the invention may be constructed of any suitable materials that impart relative stiffness or rigidity to the top tier, middle tier, and bottom tier; and relative flexibility to the flexible tiers, while permitting the tiers to be durably attached to their neighboring tiers. For example, in the respective shells 17/17', 52, and 118 of the illustrated containers, the top tier, bottom tier, and/or middle tier may be rigid and composed of polypropylene, the flexible tiers being a thermoplastic elastomer overmolded onto the polypropylene. Alternatively, the top tier, bottom tier, and/or middle tier may be rigid and composed of metal or nylon, the flexible tiers being a silicone material overmolded onto the metal or nylon with adhesive glue between the two materials to strengthen their connection.

In the respective insert containers, on the other hand, for which rigidity is less likely to be crucial (especially of the middle tier), considering that the rigidity of the non-folding tiers of the outer shell will protect the insert container and its contents, the middle tier may be merely stiff as opposed to rigid, and may be composed of the same resilient material as the flexible tiers, but simply thicker and/or more vertically aligned (i.e., less tapered or not tapered at all in its relaxed state) to resist folding under vertical compressive forces.

Moreover, the structural strength and shape retention provided by a rigid middle tier of a different material is only one of many advantages provided by indoor and outdoor containers of the present invention. Thus, where desired, components that are merely "stiff," and optionally made of the same material as the flexible tiers, but formed with shapes, alignments, and/or dimensions that resist folding, may be substituted in the place of "rigid" components of containers of the invention, not only in the inserts but even in the shells, while still retaining other advantages over existing containers.

While the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A collapsible mobile container comprising
   a collapsible shell having a top opening, a closed bottom, and a closed periphery defining a shell volume disposed below the top opening, the collapsible shell comprising
   a generally annular top shell tier;
   a bottom shell tier including a generally horizontal support surface; and
   a collapsible wall section connecting the top shell tier to the bottom shell tier, the collapsible wall section including at least three stacked, generally annular tiers;
   at least one of the collapsible shell wall section tiers being a stiff middle shell wall section tier; and
   at least two of the collapsible shell wall section tiers being flexible and configured to fold between relatively expanded and relatively collapsed positions, including at least one flexible shell wall section tier disposed above the middle shell wall section tier and at least one flexible shell wall section tier disposed below the middle shell wall section tier;
   wherein the size of the shell volume can be increased by folding at least one of the flexible shell wall section tiers from a relatively collapsed to a relatively expanded position and can be decreased by folding at least one of the flexible shell wall section tiers from a relatively expanded to a relatively collapsed position;
   at least two wheels connected to the shell bottom tier for rolling movement of the container along a generally horizontal supporting surface;
   an elongate bracing member movably connected to the top shell tier for movement between a generally horizontal stowed position and a bracing position extending generally vertically alongside the periphery of the collapsible shell in a relatively expanded position, the bracing member configured to brace in compression between the shell top tier and the shell bottom tier to inhibit collapsing movement of the shell top tier towards the shell bottom tier; and
   a handle pivotally connected to the shell top tier proximate to the location of the connection of the bracing member to the shell top tier, the handle being lockable so that the container can be tipped onto the wheels for rolling the container on the wheels wherein said handle and said end of the bracing member being pivotally connected to the shell top tier about a common horizontal axis.

2. The container of claim 1, wherein the bracing member in the bracing position has a connector removably mated to a corresponding connector in fixed relation to the shell bottom tier.

3. The container of claim 1 further comprising a lid for closing the container, the lid having a depression, wherein the handle and the bracing member can be being pivoted around the common axis into the depression.

* * * * *